United States Patent [19]
MacLeay et al.

[11] Patent Number: 5,233,047
[45] Date of Patent: Aug. 3, 1993

[54] BENZOTRIAZOLE UV ABSORBER HYDRAZIDES

[75] Inventors: Ronald E. MacLeay, Williamsville; Terry N. Myers, Grand Island, both of N.Y.

[73] Assignee: Elf Atochem North America, Inc., Philadelphia, Pa.

[21] Appl. No.: 694,192

[22] Filed: May 1, 1991

Related U.S. Application Data

[60] Continuation-in-part of Ser. No. 586,931, Sep. 24, 1990, Pat. No. 5,096,977, which is a division of Ser. No. 370,376, Jun. 23, 1989, Pat. No. 4,981,914, which is a division of Ser. No. 84,608, Aug. 12, 1987, Pat. No. 4,868,246.

[51] Int. Cl.$^5$ .............................. C07D 249/16
[52] U.S. Cl. ........................... 548/260; 548/261; 558/302; 560/13; 562/439; 562/440; 564/149; 564/150
[58] Field of Search ............... 548/260, 261; 558/302; 560/13; 562/439, 440; 564/149, 150

[56] References Cited

U.S. PATENT DOCUMENTS

| | | |
|---|---|---|
| 3,159,646 | 12/1964 | Millionis et al. |
| 3,214,436 | 10/1965 | Boyle et al. |
| 3,218,332 | 11/1965 | Heller et al. |
| 3,272,891 | 9/1966 | Milionis et al. |
| 3,399,173 | 8/1968 | Heller et al. |
| 3,542,573 | 11/1970 | Biland et al. |
| 3,629,191 | 12/1971 | Heller et al. |
| 3,629,192 | 12/1971 | Heller et al. |
| 3,766,205 | 10/1973 | Heller et al. |
| 3,862,087 | 1/1975 | Heller et al. |
| 4,692,486 | 9/1987 | Gugumus |
| 4,785,063 | 11/1988 | Slongo et al. |
| 4,892,915 | 1/1990 | Slongo et al. |
| 4,980,420 | 12/1990 | MacLeay et al. |
| 4,996,326 | 2/1991 | Leppard et al. |

FOREIGN PATENT DOCUMENTS

| | | |
|---|---|---|
| 57160 | 1/1982 | European Pat. Off. |
| 48-43658 | 12/1973 | Japan |
| 2188631A | 10/1987 | United Kingdom |
| 2196966A | 5/1988 | United Kingdom |
| 2197318A | 5/1988 | United Kingdom |

OTHER PUBLICATIONS

Chem Abstracts, CA106(8):51175a, "U.V. Stabilizers for Plastics", Vegakito et al., 1986.
P. A. Callais et al., "High Solids Coating Compositions Containing Polymer-Bound Light Stabilizer Acrylic Resins," presented at the Water-Borne & Higher Solids Coating Symposium on Feb. 1-3, 1989.

Primary Examiner—Bernard Lipman
Attorney, Agent, or Firm—Panitch Schwarze Jacobs & Nadel

[57] ABSTRACT

Hydrazide functionalized benzotrialzole and oxanilide ultraviolet absorbers (Formulas I and II) useful for stabilizing coreactive or inert polymeric compositions and novel intermediates (Formula III used to make certain types of compounds of Formula I) are disclosed and have the general formulas:

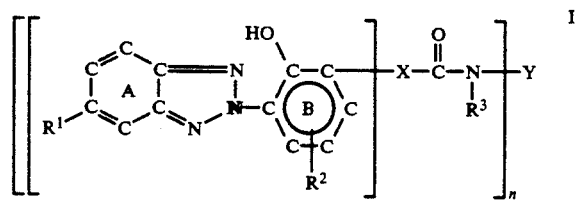

or

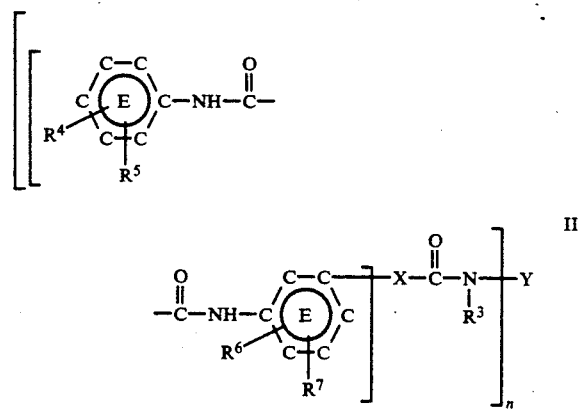

or

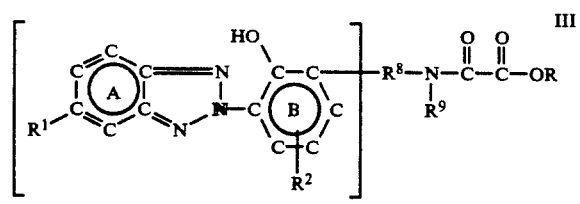

wherein $R^1$, $R^2$, $R^3$, $R^4$, $R^5$, $R^6$, $R^7$, $R^8$, $R^9$, X, Y, all substituents thereof, and n are set forth in the Summary of the Invention.

24 Claims, No Drawings

BENZOTRIAZOLE UV ABSORBER HYDRAZIDES

CROSS-REFERENCE TO RELATED APPLICATIONS

This is a continuation-in-part of copending U.S. patent application Ser. No. 07/586,931, filed Sep. 24, 1990 now U.S. Pat. No. 5,096,977; which is a division of U.S. patent application Ser. No. 7/370,376, filed Jun. 23, 1989, now U.S. Pat. No. 4,981,914; which is a division of U.S. patent application Ser. No. 07/84,608, filed Aug. 12, 1987, now U.S. Pat. No. 4,868,246.

BACKGROUND OF THE INVENTION

1. Field of the Invention

The present invention relates to compounds which incorporate both an ultraviolet light stabilizer and a hydrazide heat stabilizer functional groups. The ultraviolet light absorber can be either a 2-(2-hydroxyphenyl)-2H-benzotriazole derivative or an oxanilide derivative.

2. Description of the Prior Art

In addition to activity as a stabilizer on a molar basis (i.e., UV absorber, heat stabilizer, etc.), a successful stabilizer additive must have both excellent compatibility with and/or solubility in numerous polymer substrates, along with superior resistance to loss from the stabilized composition during procesing and end-use application. Many stabilizer additives exhibit limited compatibility in certain substrates, and excessive tendency to exude, sublime and/or volatilize during weathering or processing of stabilized compositions, particularly when use conditions require exposure to elevated temperatures. Because of this problem, several attempts have been made to increase the compatibility and reduce the volatility of such stabilizer additives by modifying their structure.

While improvements have been noted over the years, experience has shown that state-of-the-art stabilizers do not exhibit the desired combination of properties in all resins and that new polymeric compositions continue to invoke additional structural modifications on any potential heat and/or light stabilizer intended for use. Two examples of this would be in "high solids" coatings which require greater solubility of the stabilizer due to the use of less solvent, and in engineering thermoplastics where processing temperatures (in excess of 250° C.) require the use of stabilizers with high thermal stability and very low volatility. No one stabilizer to date provides the properties necessary for universal application and there is a constant commercial need for new stabilizers offering a range of property advantages.

Systems which incorporate UV absorbers and other functional groups are known. Multifunctional stabilizers have been prepared by reacting one type of stabilizer with another to obtain a higher molecular weight compound having dual functionality or by reacting two or more stabilizers with a multifunctional coupling agent in a stepwise fashion.

Japanese Patent 73/43568 (*Chemical Abstracts* 81:122589s) discloses the use of a 2-(2-hydroxyphenyl)-2H-benzotriazole UV absorber and a hydrazide to give enhanced resistance to photodegradation of polyurethane copolymer fibers.

U.S. Pat. No. 4,785,063 discloses certain benzotriazole hydrazides and a copolymerizable acyl hydrazide derivative.

SUMMARY OF THE INVENTION

The novel compounds of this invention have the following general formulas:

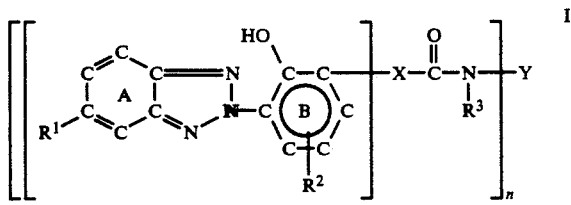

or

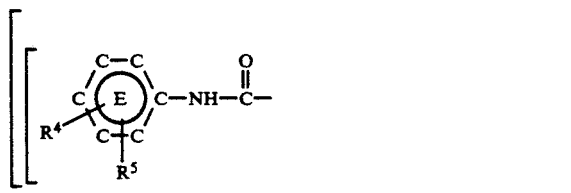

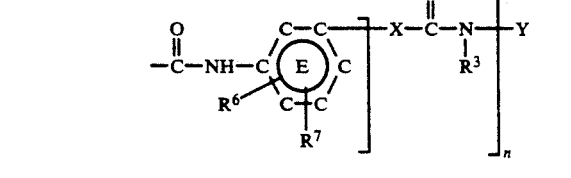

or

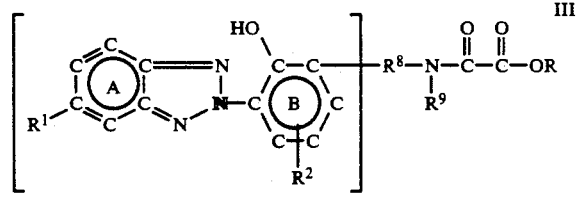

where

R is alkyl of 1–4 carbons or phenyl.

$R^1$ is hydrogen, substituted or unsubstituted aliphatic of 1–8 carbons, substituted or unsubstituted alkoxy of 1–8 carbons, substituted or unsubstituted alkoxycarbonyl of 2–8 carbons, alkylaminocarbonyl of 2–5 carbons, dialkylaminocarbonyl of 3–9 carbons, substituted or unsubstituted N-(alkyl)-N-(aryl)aminocarbonyl of 8–15 carbons, alkoxysulfonyl of 1–4 carbons, —C(=O)—OH—, —C(=O)NH$_2$, or —S(=O)$_2$—OH. Preferably, $R^1$ is hydrogen, substituted or unsubstituted aliphatic of 1–8 carbons, substituted or unsubstituted alkoxy of 1–8 carbons, methoxycarbonyl, ethoxycarbonyl, carboxy, chloro or S(=O)$_2$—OH. Most preferably, $R^1$ is hydrogen, alkyl of 1–4 carbons, methoxy, ethoxy, chloro, or carboxy.

$R^2$ is hydrogen, substituted or unsubstituted aliphatic of 1–8 carbons, substituted or unsubstituted aryl of 6–14 carbons, substituted or unsubstituted araliphatic of 7–22 carbons, substituted or unsubstituted alkoxy of 1–8 carbons, alkylaminocarbonyl of 2–5 carbons, dialkylaminocarbonyl of 3–9 carbons, or substituted or unsubstituted N-(alkyl)-N-(aryl)aminocarbonyl of 8–15 carbons. Preferably, $R^2$ is hydrogen, substituted or unsubstituted aliphatic of 1–8 carbons, or substituted or ununsubstituted araliphatic of 7-9 carbons. Most preferably, $R^2$ is methyl, ethyl, t-butyl, t-octyl, or 1-methyl-1-phenylethyl.

$R^3$ is hydrogen, substituted or unsubstituted aliphatic of 1-20 carbons, substituted or unsubstituted araliphatic of 7-22 carbons, or substituted or unsubstituted alicyclic of 5-12 carbons. Preferably, $R^3$ is hydrogen.

$R^4$, $R^5$, $R^6$ and $R^7$ are independently hydrogen, hydroxy, substituted or unsubstituted aliphatic of 1-8 carbons, substituted or unsubstituted aryl of 6-14 carbons, substituted or unsubstituted araliphatic of 7-22 carbons, substituted or unsubstituted alkoxy of 1-12 carbons or substituted or unsubstituted alkylthio of 1-12 carbons, chloro, bromo, or substituted or unsubstituted alkoxycarbonyl of 2-8 carbons. Preferably, $R^4$, $R^5$, $R^6$ and $R^7$ are independently hydrogen, hydroxy, alkyl of 1-8 carbons, alkoxy of 1-8 carbons, alkylthio of 1-8 carbons, chloro, brom, or alkoxycarbonyl of 2-8 carbons. Most preferably, $R^4$, $R^5$, $R^6$ and $R^7$ are independently hydrogen, hydroxy, alkyl of 1-8 carbon, alkoxy of 1-4 carbons, alkylthio of 1-4 carbons, methoxycarbonyl or ethoxycarbonyl.

X is $X_a$ when attached to ring A, $X_b$ when attached to ring B and $X_e$ when attached to either ring E.

$X_a$ is a direct bond.

$X_b$ and $X_e$ are divalent radicals of formula $-Z_x-R^8-\{-N(R^9)-[C(=O)]_y-R^{10}-\}_z-$.

Z is $-O-$, $-N(R^{11})-$, $-S-$, or $-S(=O)_2-$.

x, y and z are independently 0 or 1.

$R^8$ is a direct bond or substituted or unsubstituted alkylene diradical of 1-4 carbons, with the proviso that when both x and z are 1, $R^8$ is not a direct bond. Preferably, $R^8$ is a direct bond, methylene or 1,2-ethanediyl.

$R^9$ is hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons. Preferably, $R^9$ is hydrogen, substituted or unsubstituted aliphatic of 1-12 carbons, substituted or unsubstituted alicyclic of 5-8 carbons, substituted or unsubstituted phenyl, or substituted or unsubstituted araliphatic of 7-14 carbons. Most preferably, $R^9$ is selected from hydrogen substituted or unsubstituted aliphatic of 1-10 carbons, substituted or unsubstituted cyclohexyl, substituted or unsubstituted phenyl, or substituted or unsubstituted araliphatic of 7-9 carbons.

$R^{10}$ is a direct bond, substituted or unsubstituted aliphatic diradical of 1-20 carbons, substituted or unsubstituted aryl diradical of 6-12 carbons, substituted or unsubstituted alicyclic diradical of 5-12 carbons, or substituted or unsubstituted araliphatic diradical of 7-22 carbons. Preferably, $R^{10}$ is a direct bond, aliphatic diradical of 1-8 carbons, 1,3-phenylene diradical or 1,4-phenylene diradical. Most preferably, $R^{10}$ is a direct bond or alkylene diradical of 1-8 carbons.

$R^{11}$ independently is any of the groups of $R^9$.

n is 1 or 2.

When n is 1, Y is

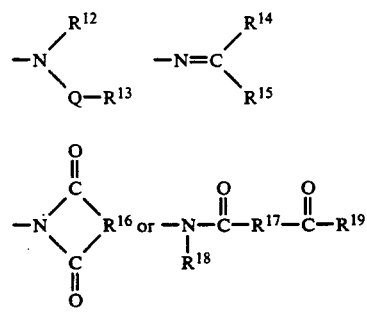

When n is 2, Y is

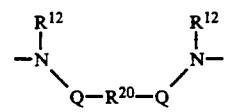

$R^{12}$ is hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons. Preferably, $R^{12}$ is hydrogen, substituted or unsubstituted aliphatic of 1-12 carbons, substituted or unsubstituted alicyclic of 5-8 carbons, substituted or unsubstituted phenyl, or substituted or unsubstituted araliphatic of 7-9 carbons. Most preferably, $R^{12}$ is hydrogen, substituted or unsubstituted aliphatic of 1-10 carbons, substituted or unsubstituted cyclohexyl, substituted or unsubstituted phenyl, or substituted or unsubstituted araliphatic of 7-14 carbons.

$R^{13}$ is hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons, and when alicyclic, $R^{13}$ may optionally contain 1-6 heteroatoms $-O-$, $-S-$ or $-N(R^{21})-$, with the proviso that multiple heteroatoms must be separated from each other and the chain ends by at least one carbon atom. Preferably, $R^{13}$ is hydrogen, substituted or unsubstituted aliphatic of 1-12 carbons substituted or unsubstituted alicyclic of 5-8 carbons, substituted or unsubstituted phenyl, or substituted or unsubstituted araliphatic of 7-9 carbons, and when alicyclic, $R^{13}$ may optionally contain 1 or 2 heteroatoms $-O-$ and $-N(R^{21})-$, with the proviso that multiple heteroatoms are separated from each other and the chain ends by at least one carbon atom. Most preferably, $R^{13}$ is hydrogen, substituted or unsubstituted aliphatic of 1-10 carbons, substituted or unsubstituted cyclohexyl, substituted or unsubstituted phenyl, or substituted or unsubstituted araliphatic of 7-14 carbons, and when alicyclic, $R^{13}$ is substituted 2,2,6,6-tetraalkyl-4-piperidinyl.

Q is $-C(=O)-$ except when x and z are 0, $-S(=O)_2-$, $-C(=O)-O-$, $-[C(=O)]_2-O-$, $-C(=O)-N(R^{22})-$, $-[C(=O)]_2-N(R^{22})-$, $-C(=S)-N(R^{22})-$, $-C(=O)-R^{17}-C(=O)-N(R^{22})-$, or, when n is 1, a direct bond between the nitrogen and $R^{13}$. Preferably, Q is $-C(=O)-$ except when x and z are 0, $-C(=O)-O-$, $-[C(=O)]_2-O-$, $-C(=O)-N(R^{22})-$, $-[C(=0)]_2-N(R^{22})-$, or, when n is 1, a direct bond between the nitrogen and $R^{13}$.

$R^{14}$ and $R^{15}$ are independently hydrogen, substituted or unsubstituted aliphatic of 1-20 carbons, substituted or unsubstituted alicyclic of 5–12 carbons, substituted or unsubstituted aryl of 6–14 carbons, or substituted or unsubstituted araliphatic of 7–22 carbons, or $R^{14}$ and $R^{15}$ may be linked together to form a substituted or unsubstituted alicyclic ring of 5–12 carbons or may be linked together through a heteroatom —N($R^{21}$)—, —O— or —S— to form a heterocyclic ring of 5–12 atoms. Preferably, $R^{14}$ and $R^{15}$ are independently substituted or unsubstituted aliphatic of 1–8 carbons, substituted or unsubstituted alicyclic of 5–8 carbons, substituted or unsubstituted aryl of 6–12 carbons, and substituted or unsubstituted araliphatic of 7–14 carbons, and may be linked together to form a substituted or unsubstituted cyclohexyl ring or a substituted or unsubstituted 2,2,6,6-tetraalkyl-4-piperidine ring. Most preferably, $R^{14}$ and $R^{15}$ are independently aliphatic of 1–8 carbons, alicyclic of 5–8 carbons or may be linked together to form a substituted or unsubstituted cyclohexyl ring or a 2,2,6,6-tetramethyl-4-piperidinyl ring.

$R^{16}$ is a substituted or unsubstituted aliphatic diradical of 2–200 carbons with the proviso that when x and z are 0 $R^{16}$ is not 1,2-ethenediyl, substituted or unsubstituted aryl diradical of 6–14 carbons, substituted or unsubstituted alicyclic diradical of 5–12 carbons, or substituted or unsubstituted araliphatic diradical of 7–22 carbons, and the diradical may optionally contain 1–6 heteroatoms —O—, —S— or —N($R^{21}$)—, with the provisos that (a) multiple heteroatoms must be separated from each other and the diradical ends by at least one carbon atom, and (b) the cyclic group formed contains 5 or 6 atoms in the ring. Preferably, $R^{16}$ is a substituted or unsubstituted aliphatic diradical of 2–30 carbons, substituted or unsubstituted ortho-phenylene, substituted or unsubstituted alicyclic diradical of 6–8 carbons and the diradical may optionally contain 1 or 2 heteroatoms —O— or —N($R^{21}$)—, with the provisos stated above. Most preferably, $R^{16}$ is a substituted or unsubstituted aliphatic diradical of 2–20 carbons.

$R^{17}$ is a substituted or unsubstituted aliphatic diradical of 1–200 carbons, substituted or unsubstituted aryl diradical of 6–14 carbons, substituted or unsubstituted alicyclic diradical of 5–12 carbons, or substituted or unsubstituted araliphatic diradical of 7–22 carbons, and the diradical may optionally contain 1–6 heteroatoms —O—, —S—, or —N($R^{21}$)—, with the proviso that multiple heteroatoms must be separated from each other and the diradical ends by at least one carbon atom. Preferably, $R^{17}$ is a substituted or unsubstituted aliphatic diradical of 2–18 carbons, substituted or unsubstituted phenylene, substituted or unsubstituted alicyclic diradical of 6–8 carbons, and the diradical may optionally contain 1 or 2 heteroatoms —O— or —N($R^{21}$)—, with the proviso stated above. Most preferably, $R^{17}$ is a substituted or unsubstituted aliphatic diradical of 2–8 carbons.

$R^{18}$ is hydrogen, substituted or unsubstituted aliphatic of 1–20 carbons, substituted or unsubstituted araliphatic of 7–22 carbons, or substituted or unsubstituted alicyclic of 5–12 carbons. Preferably, $R^{18}$ is hydrogen, substituted or unsubstituted aliphatic of 1–8 carbons, substituted or unsubstituted araliphatic of 7–8 carbons, or substituted or unsubstituted alicyclic of 5–8 carbons. Most preferably, $R^{18}$ is hydrogen, substituted or unsubstituted aliphatic of 1–10 carbons, substituted or unsubstituted cyclohexyl or benzyl.

$R^{19}$ is $R^{13}$—NH— or OM.

$R^{20}$ is a substituted or unsubstituted aliphatic diradical of 1–20 carbons, substituted or unsubstituted aryl diradical of 6–12 carbons, substituted or unsubstituted alicyclic diradical of 5–14 carbons, or substituted or unsubstituted araliphatic diradical of 7–22 carbons. Preferably, $R^{20}$ is a substituted or unsubstituted aliphatic diradical of 2–12 carbons, substituted or unsubstituted aryl diradical of 6–12 carbons, substituted or unsubstituted alicyclic diradical of 5–12 carbons, or substituted or unsubstituted araliphatic diradical of 7–12 carbons. Most preferably, $R^{20}$ is a substituted or unsubstituted aliphatic diradical of 2–10 carbons, substituted or unsubstituted phenylene, substituted or unsubstituted alicyclic diradical of 5–8 carbons, or substituted or unsubstituted araliphatic diradical of 7–12 carbons.

$R^{21}$ is hydrogen, aliphatic of 1 to 8 carbons, aliphatic acyl of 2–6 carbons, or substituted or unsubstituted benzoyl. Preferably, $R^{21}$ is methyl or hydrogen.

As used herein, the term "acyl" refers to a radical generated from a carboxylic acid by removal of the OH group to provide a free valence on the C(=O) group, for example DC(=O)—OH would become the DC(=O)— substituent, referred to generally as a D acyl group.

$R^{22}$ is hydrogen or aliphatic of 1 to 4 carbons. Preferably, $R^{22}$ is methyl or hydrogen.

M is hydrogen, sodium ion, potassium ion or ammonium ion. Preferably, M is hydrogen or sodium ion. Most preferably, M is hydrogen.

Optional substituents for $R^1$, $R^2$, $R^3$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ are independently one or more of the following: chloro, bromo, alkyl of 1–4 carbons, alkoxy of 1–8 carbons, phenoxy, cyano, hydroxy, epoxy, carboxy, alkyoxycarbonyl of 2–6 carbons, acyloxy of 1–4 carbons, acryloyl, acryloyloxy, methacryloyl, methacryloyloxy, hydroxymethyl, hydroxyethyl, alkylthio of 1–4 carbons, or trialkoxysilyl of 3–12 carbons.

Additional optional substituents for $R^{13}$ are aliphatic of 1–20 carbons, cycloaliphatic of 5–12 carbons, aryl of 6–14 carbons, aralkyl of 7–22 carbons, alkoxy of 1–20 carbons, cycloalkoxy of 5–12 carbons, aryloxy of 6–14 carbons, aralkoxy of 7–15 carbons, aliphatic acyloxy of 2–20 carbons, alicyclic acyloxy of 6–13 carbons, aryl acyloxy of 7–15 carbons, or araliphatic acyloxy of 8–16 carbons.

Additional optional substitutents for $R^{16}$ and $R^{18}$ are independently alkyl of 5–180 carbons, alkylthio of 5–180 carbons, aralkylthio of 7–20 carbons, arylthio of 6–20 carbons, alkenyl of 2–180 carbons, cycloalkenyl of 5–12 carbons, aryl of 6–16 carbons, aralkyl of 7–17 carbons, aryloxy of 6–16 carbons, alkoxycarbonyl of 7–10 carbons, or (alkoxycarbonyl)alkylthio of 3–30 carbons.

DETAILED DESCRIPTION OF THE PREFERRED EMBODIMENTS

General Formula

The novel compounds of Formulas I and II are UV absorber compounds.

The compounds of Formula III are ester precursors used as intermediate to make certain hydrazides of Formula I having corresponding structures and substituents. The compounds of the present invention have the following general formulas:

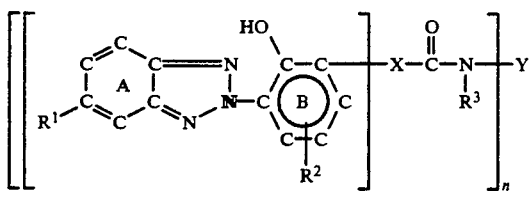

or

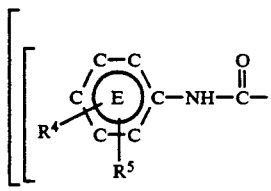

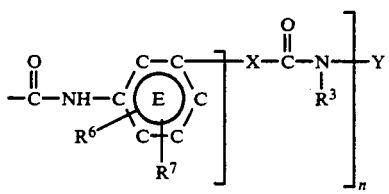

or

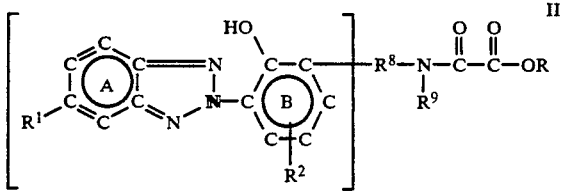

where R, $R^1$, $R^2$, $R^3$, $R^4$, $R^5$, $R^6$, $R^7$, $R^8$, $R^9$, X and Y, all substituents thereof, and n are as previously defined.

Generic Group Examples

As substituted or unsubstituted aliphatic of 1-8 carbons, $R^1$, $R^2$, $R^4$, $R^5$, $R^6$, $R^7$ and $R^{21}$ are, independently, for example, methyl, 2-hydroxyethyl, ethyl, 2-acetoxyethyl, isopropyl, 2-chloroethyl, allyl, methallyl, pentyl, 2-(methacryloyloxy)ethyl, 3-pentyl, t-butyl, hexyl, octyl, or t-octyl.

As substituted or unsubstituted aliphatic of 1-20 carbons, $R^3$, $R^9$, $R^{11}$, $R^{12}$, $R^{13}$, $R^{14}$, $R^{15}$, $R^{18}$ and $R^{19}$ are, independently, for example, methyl, ethyl, n-propyl, isopropyl, butyl, allyl, n-pentyl, 2-bromoethyl, hexyl, heptyl, octyl, nonyl, decyl, propargyl, octadecyl, dodecyl, isododecyl, 2-acetoxyethyl, tetradecyl, 2-methallyl, 2-hexenyl, 10-undecenyl, 2-dodecenyl, n-butyl, 2-hydroxyethyl, 2-butenyl, 2-hydroxyhexadecyl, 2-hydroxypropyl, 2-hexenyl, 10-undecenyl, 2-hydroxydodecyl, 2-hydroxy-5-hexenyl, 2-hydroxyhexyl, 2-hydroxydecyl, 2-hydroxyoctadecyl, 2-hydroxy-3-(methacryloyloxy)propyl, 2-hydroxy-3-(acryloyloxy)propyl, 2-hydroxy-3-phenoxypropyl, 2-hydroxy-3-(4-methoxyphenoxy)propyl, 2-hydroxy-3-isopropoxypropyl, 2-hydroxy-3-methoxypropyl, 2-hydroxy-3-(2-ethylhexyloxy)propyl, 3-(trimethoxysilyl)propyl, 2-hydroxy-3-(cyclohexyloxy)propyl, 2-hydroxy-3-(benzyloxy)propyl, 2-hydroxy-3-(benzoyloxy)propyl, 2-hydroxy-3-dodecyloxypropyl, 2-hydroxybutyl, 1-methyl-2-hydroxypropyl, cyanomethyl, 2,3-epoxypropyl, or 2-(dimethylamino)ethyl.

As substituted or unsubstituted alkoxy of 1-8 carbons, $R^1$ and $R^2$ are, independently, for example, methoxy, ethoxy, 2-ethylhexyloxy, isopropoxy, 2-hydroxypropoxy, 2-(acyloyloxy)ethoxy, or sec-butoxy.

As substituted or unsubstituted alkoxycarbonyl of 2-8 carbons, $R^1$, $R^4$, $R^5$ and $R^7$ are, independently, for example, methoxycarbonyl, ethoxycarbonyl, 2-hydroxyethoxy, allyloxycarbonyl, or butoxycarbonyl.

As alkylaminocarbonyl of 2-5 carbons, dialkylaminocarbonyl of 3-9 carbons and substituted or unsubstituted N-(aryl)-N-(alkyl)aminocarbonyl of 8-15 carbons, $R^1$ and $R^2$ are, independently, for example, methylaminocarbonyl, ethylaminocarbonyl, butylaminocarbonyl, N-(4-methylphenyl)-N-methylaminocarbonyl, N-phenyl-N-methylaminocarbonyl, N-(2-ethoxyphenyl)-N-ethylaminocarbonyl, N-(3-isopropenylphenyl)-N-butylaminocarbonyl, dimethylaminocarbonyl, or dibutylaminocarbonyl.

As alkoxysulfonyl of 1-4 carbons, $R^1$ is, for example, methoxysulfonyl, or butoxysulfonyl.

As substituted or unsubstituted alkoxy of 1-12 carbons or substituted or unsubstituted alkylthio of 1-12 carbons, $R^4$, $R^5$, $R^6$ and $R^7$ are, independently, for example, methoxy, ethoxy, 2-ethylhexyloxy, isopropoxy, 2-hydroxypropoxy, 2-acetoxyethoxy, sec-butoxy, dodecyloxy, methylthio, ethylthio, isopropylthio, butylthio, dodecylthio, octylthio, or hexylthio.

As substituted or unsubstituted alicyclic of 5-12 carbons, $R^3$, $R^9$, $R^{11}$, $R^{12}$, $R^{13}$, $R^{14}$, $R^{15}$, $R^{18}$ and $R^{19}$ are, independently, for example, cyclohexyl, trimethylcyclohexyl, cyclooctyl, cyclododecyl, 4-t-butylcyclohexyl, 2-hydroxycyclododecyl, 3-cyclohexenyl, 2-hydroxycyclohexyl, 2-hydroycyclopentyl, cyclododecyl, 4-octylcyclohexyl, or 2-methyl-4-octylcyclohexyl.

As substituted or unsubstituted aryl of 6-14 carbons, $R^2$, $R^4$, $R^5$, $R^6$, $R^7$, $R^9$, $R^{11}$, $R^{12}$, $R^{13}$, $R^{14}$, $R^{15}$ and $R^{19}$ are, independently, for example, phenyl, tolyl, 4-chlorophenyl, isopropylphenyl, isopropenylphenyl, anisyl, 3,5-di-t-butyl-4-hydroxyphenyl, 3,5-di-t-amyl-4-hydroxyphenyl, 4-vinylphenyl, 3-t-butyl-5-methyl-4-hydroxyphenyl, naphthyl, 3-methyl-5-t-butyl-4-hydroxyphenyl, 3,4,5-trimethoxyphenyl, or 4-di(methylamino)phenyl.

As substituted or unsubstituted araliphatic of 7-22 carbons, $R^2$, $R^3$, $R^4$, $R^5$, $R^6$, $R^7$, $R^9$, $R^{11}$, $R^{12}$, $R^{13}$, $R^{14}$, $R^{15}$, $R^{18}$ and $R^{19}$ are independently, for example, benzyl, 3-methylbenzyl, 4-t-butylbenzyl, cinnamyl, 3,5-di-t-butyl-4-hydroxybenzyl, 2-hydroxy-2-phenylethyl, 2-phenylethyl, cumyl, trimethylbenzyl, 4-octyloxybenzyl, naphthylmethyl, or (4-dodecylphenyl)methyl, 2-(3,5-di-t-butyl-4-hydroxyphenyl)ethyl, 2-(3,5-di-t-amyl-4-hydroxyphenyl)ethyl, or 2-(3-t-butyl-5-methyl-4-hydroxyphenyl)ethyl.

As substituted or unsubstituted alkylene diradical of 1-4 carbons, $R^8$ is, for example, methylene, 1,2-ethanediyl, 1,1-ethanediyl, 2-hydroxy-1,3-propanediyl, 1,2-propanediyl, 1,3-propanediyl, 2-methoxy-1,3-propanediyl, 1,2-butanediyl, 1,3-butanediyl, or 1,4-butanediyl.

As substituted or unsubstituted aliphatic diradical of 1-20 carbon, substituted or unsubstituted aryl diradical of 6-12 carbons, substituted or unsubstituted alicyclic diradical of 5-12 carbons and substituted or unsubstituted araliphatic diradical of 7-22 carbons, $R^{10}$ is, for example, methylene, 1,2-ethanediyl, 1,2-propanediyl, 1,3-propanediyl, 1,4-butanediyl, 1,18-octadecanediyl, 2,2-dimethyl-1,3-propanediyl, 2-methylpentane-2,4- diyl, 1,10-decanediyl, 1,12-dodecanediyl, 3-oxapentane-1,5-diyl, 4-oxaheptane-1,7-diyl, 3,6-dioxaoctane-1,8-diyl, 4,9-dioxadodecane-1,12-diyl, 4-methyl-4-azaheptane-1,4-diyl, 3,6-diaza-3,6-dimethyl-1,8-octanediyl, 3-methyl-3-azapentane-1,5-diyl, 1,2-cyclohexanediyl, 1,4-cyclohexanediyl, 1,2-ethenediyl, 1,2-propenediyl, 1-chloro-1,2-ethenediyl, 1-phenyl-1,2-ethenediyl, 1,3-hexanediyl, 1,2-cyclohexanediyl, 1,2-phenylene, 4-methyl-4-cyclohexene-1,2-diyl, 4-cyclohexene-1,2-diyl 4-methylcyclohexane-1,2-diyl, 4-carboxy-1,2-phenylene, 4-methoxycarbonyl-1,2-phenylene, propane-2,2-bis[4-cyclohexyl], 3-oxapentane-1,5-diyl, methylenebis[4-cyclohexyl], 1,2-, 1,3-, or 1,4-phenylene, 1,2-, 1,3-, or 1,4-phenylenebis(methyl), biphenyl-4,4'-diyl, biphenyl-3,3'-diyl, biphenyl- 3,4'-diyl, or methylenebis[phenylene].

When alicyclic and optionally containing 1-6 heteroatoms —O—, —S— and —N($R^{21}$)—, with the proviso that multiple heteroatoms must be separated from each other and the chain ends by at least one carbon atom, $R^{13}$ is, for example, 2,2,6,6-tetramethyl-4-piperidinyl, 2,6-diethyl-1,2,3,6-tetramethyl-4-piperidinyl, 1-acetyl-2,2,6,6-tetramethyl-4-piperidinyl and 1-(4-methylbenzoyl)-2,6-dimethyl-2,6-dipropyl-3-ethyl-4-piperidinyl.

When linked together to form a substituted or unsubstituted alicyclic ring of 5-12 atoms or when linked together through a heteroatom —N($R^{21}$)—, —O— or —S—, $R^{14}$ and $R^{15}$ are, for example, cyclopentyl, cyclohexyl, cycloheptyl, 4-t-butylcyclohexyl, 2-methylcyclohexyl, cyclooctyl, 2,2,6,6-tetramethyl-4-piperidinyl, 2,6-diethyl-2,3,6-trimethyl-4-piperidinyl, 1,2,2,6,6-pentamethyl-4-piperidinyl, 1-ethyl-2,2,6,6-tetramethyl-4-piperidinyl, 4-oxacyclohexyl, and 4-thiacyclohexyl.

As substituted or unsubstituted aliphatic diradical of 2-200 carbons, substituted or unsubstituted aryl diradical of 6-14 carbons, substituted or unsubstituted alicyclic diradical of 5-12 carbons, or substituted or unsubstituted araliphatic diradical of 7-22 carbons, any of which may optionally contain 1-6 heteroatoms —O—, —S—, or —N($R^{21}$)—, with the provisos that (a) multiple heteroatoms must be separated from each other by at least one carbon atom and (b) the cyclic group formed contains 5 or 6 atoms in the ring, $R^{16}$ is, for example, 1,2-ethanediyl, 1,2-ethenediyl except when x and z are 0, 1,3-propanediyl, 1,2-propenediyl, 2-thiapropane-1,3-diyl, 2-oxapropane-1,3-diyl, 1-chloro-1,2-ethenediyl, 1-phenyl-1,2-ethenediyl, 1,3-hexanediyl, 2-azapropane-1,3-diyl, 2-methyl-2-azapropane-1,3-diyl, 1,2-cyclohexanediyl, 1,2-phenylene, 4-methyl-4-cyclohexene-1,2-diyl, 4-cyclohexene-1,2-diyl, 4-methylcyclohexane-1,2-diyl, norbornane-2,3-diyl, 5-norbornene-2,3-diyl, bicyclo[2.2.2]octane-2,3-diyl, bicyclo[2.2.2]oct-5-ene-2,3-diyl, bicyclo[2.2.1]heptane-1,2-diyl, 4-carboxy-1,2-phenylene, 4-methoxycarbonyl-1,2-phenylene; 1-(substituted)ethane-1,2-diyl, wherein the substituent is hydrogen, chloro, phenyl, methyl, ethyl, propyl, butyl, hexyl, octyl, decyl, dodecyl, hexadecyl, octadecyl, hexenyl, isohexenyl, diisobutenyl, decenyl, dodecenyl, isododecenyl, octenyl, nonenyl, tetradecenyl, hexadecenyl, octadecenyl, isooctadecenyl, triacontenyl, or polyisobutenyl; 1-(substituted)ethane-1,2-diyl, 5-(substituted)norbornane-2,3-diyl, 5-(substituted)bicyclo[2.2.2]octane-2,3-diyl, or 4-(substituted)cyclohexane-1,2-diyl, wherein the substituent is methylthio, ethylthio, butylthio, hexylthio, octylthio, hexadecylthio, octadecylthio, 2-hydroxyethylthio, phenylthio, benzylthio, (3,5-di-t-butyl-4-hydroxy)phenylthio, or (3-t-butyl-5-methyl-4-hydroxyphenyl)benzylthio.

As substituted or unsubstituted aliphatic diradical of 1-200 carbons, substituted or unsubstituted aryl diradical of 6-14 carbons, substituted or unsubstituted alicyclic diradical of 5-12 carbons, or substituted or unsubstituted araliphatic diradical of 7-22 carbons, any of which may optionally contain 1-6 heteroatoms —O—, —S—, or —N($R^{21}$)—, with the proviso that multiple heteroatoms must be separated from each other by at least one carbon atom, $R^{17}$ is, for example, methylene, 1,2-ethanediyl, 1,2-ethenediyl, 1,3-propanediyl, 1,2-propenediyl, 2-thiapropane-1,3-diyl, 3-thiapentane-1,2-diyl, 2-oxapropane-1,3-diyl, 1-chloro-1,2-ethenediyl, 1-phenyl-1,2-ethenediyl, 1,3-hexanediyl, 2-azapropane-1,3-diyl, 2-methyl-2-azapropane-1,3-diyl, 1,2-cyclohexanediyl, 1,2-phenylene, 4-methyl-4-cyclohexene-1,2-diyl, 4-cyclohexene-1,2-diyl, 4-methylcyclohexane-1,2-diyl, norbornane-2,3-diyl, 5-norbornene-2,3-diyl, bicyclo[2.2.2]octane-2,3-diyl, bicyclo[2.2.2]oct-5-ene-2,3-diyl, bicyclo[2.2.1]heptane-1,2-diyl, bicyclo[2.2.1]heptane-1,2-diyl, 4-carboxy-1,2-phenylene, 4-methoxycarbonyl-1,2-phenylene, propane-2,2-bis[4-cyclohexyl], 3-oxapentane-1,5-diyl, methylenebis[4-cyclohexyl], 1,2-, 1,3-, or 1,4-phenylene, 1,2-, 1,3-, or 1,4-phenylenebis(methyl), or 2,5-diazahexane-1,6-diyl, biphenyl-4,4'-diyl, biphenyl-3,3'-diyl, biphenyl-3,4'-diyl, methylenebis[phenylene]; 1-(substituted)ethane-1,2-diyl, wherein the substituent is hydrogen, chloro, phenyl, methyl, ethyl, propyl, butyl, hexyl, octyl, decyl, dodecyl, hexadecyl, octadecyl, hexenyl, isohexenyl, diisobutenyl, decenyl, dodecenyl, isododecenyl, octenyl, nonenyl, tetradecenyl, hexadecenyl, octadecenyl, isooctadecenyl, triacontenyl, or polyisobutenyl; 1-(substituted)ethane-1,2-diyl, 5-(substituted)norbornane-2,3-diyl, 5-(substituted)bicyclo[2.2.2]octane-2,3-diyl, or 4-(substituted)cyclohexane-1,2-diyl, wherein the substituent is methylthio, ethylthio, butylthio, hexylthio, octylthio, hexadecylthio, octadecylthio, 2-hydroxyethylthio, phenylthio, benzylthio, (3,5-di-t-butyl-4-hydroxy)phenylthio, or (3-t-butyl-5-methyl-4-hydroxyphenyl)benzylthio.

As substituted or unsubstituted aliphatic diradical of 1-20 carbons, substituted or unsubstituted aryl diradical of 6-12 carbons, substituted or unsubstituted alicyclic diradical of 5-12 carbons, or substituted or unsubstituted araliphatic diradical of 7-22 carbons, $R^{20}$ is, for example, methylene, ethane-1,2-diyl, ethene-1,2-diyl, propane-1,3-diyl, propene-1,2-diyl, 2-thiapropane-1,3-diyl, 2-oxapropane-1,3-diyl, hexane-1,3-diyl, 2-azapropane-1,3-diyl, 2-methyl-2-aza-propane-1,3-diyl, cyclohexane-1,2-diyl, 1,2-phenylene, 1,3-phenylene, 1,4-phenylene, hexane-1,6-diyl, octane-1,8-diyl, decane-1,10-diyl, dodecane-1,12-diyl, 3-hexene-1,6-diyl, 4-methyl-1,2-phenylene, 4-chloro-1,2-phenylene, 4-methylcyclohexane-1,2-diyl, cyclohexane-1,2-diyl, 4-methyl-4-cyclohexene-1,2-diyl, toluene-alpha,2-diyl, toluene-alpha,3-diyl, toluene-alpha,4-diyl, or isophoronediyl.

As aliphatic acyl of 2-6 carbons and substituted or unsubstituted benzoyl, $R^{21}$ is, for example, acetyl, propionyl, pivaloyl, isobutanoyl, hexanoyl, benzoyl, 4-hydroxybenzoyl, 4-methylbenzoyl, 2,4-dichlorobenzoyl, 3,5-di-t-butyl-4-hydroxybenzoyl, or 3-isopropenylbenzoyl.

List of Example Compounds

Examples of stabilizer compounds of the present invention include the following, non-limiting list of compounds:

1. 10-[2-hydroxy-3-(2H-benzotriazol-2-yl)-5-methylphenyl]-5,6,9-triaza-4,7,8-trioxodecanoic acid, sodium salt
2. 1,20-di[3-(2H-benzotriazol-2-yl)-4-hydroxy-5-t-butylphenyl]-4,5,7,14,16,17-hexaaza-3,6,15,18-tetraoxoecosane
3. 1,18-di[2-hydroxy-3-(2H-benzotriazol-2-yl)-5-methylphenyl]-2,5,6,13,14,17-hexaaza-3,4,7,12,15,16-hexaoxooctadecane
4. 1,16-di[3-hydroxy-4-(2H-benzotriazol-2-yl)phenoxy]-3,4,13,14-tetraaza-2,5,12,15-tetraoxo-6,11-dioxahexadecane
5. 1,4-phenylenebis{N'-[4-([(2-hydroxy-3-(2H-benzotriazol-2-yl)-5-methylphenyl)methyl]amino)-4-oxobutanoyl]sulfonyl hydrazide}
6. 1,28-di[2-hydroxy-3-(2H-benzotriazol-2-yl)-5-methyl]-2,9,10,12,17,19,20,27-octaaza-3,8,21,26-tetraoxo-11,18-di(thioxo)octacosane
7. N-[(2-hydroxy-3-(2H-benzotriazol-2-yl)-5-methylphenyl)methyl]hydrazinecarboxamide
8. 2-{[2-hydroxy-3-(2H-benzotriazol-2-yl)-5-methylphenyl]methylamino}-2-oxoacetyl hydrazide
9. 3-{N-[2-hydroxy-3-(2H-benzotriazol-2-yl)-5-t-butylphenyl]methyl-N-methylamino}-3-oxo-N'-methylpropionyl hydrazide
10. 4-{N-[2-hydroxy-3-(5-chloro-2H-benzotriazol-2-yl)-5-ethylphenyl]methyl-N-butylamino}-4-oxo-N'-(benzoyl)butanoyl hydrazide
11. 4-{N-[2-hydroxy-3-(5-(ethoxycarbonyl)-2H-benzotriazol-2-yl)-5-t-amylphenyl] methyl-N-ethylamino}-4-oxo- N'-(ethylaminocarbonyl)butanoyl hydrazide
12. 9-{[2-hydroxy-3-(5-[aminocarbonyl]-2H-benzotriazol-2-yl)-5-(1-methyl-1-phenylethyl)phenyl]methylamino}-9-oxo-N'-(diethylaminocarbonyl)nonanoyl hydrazide
13. 7-{[2-hydroxy-3-(5-[carboxy]-2H-benzotriazol-2-yl)-5-(1-ethylpentyl)-phenyl]methylamino}-7-oxo-4-thia-N'-(phenylsulfonyl)heptanoyl hydrazide
14. 3-[3-(2H-benzotriazol-2-yl)-4-hydroxy-5-t-octylphenyl]-N'-(propyl)propionyl hydrazide
15. 2-[3-(5-chloro-2H-benzotriazol-2-yl)-4-hydroxy-5-t-butylphenyl]-N'-(ethoxycarbonyl)acetyl hydrazide
16. 5-[3-(5-[ethoxycarbonyl]-2H-benzotriazol-2-yl)-4-hydroxy-5-methylphenyl]-pentanoyl hydrazide, 2,2,6,6-tetramethyl-4-piperidone hydrozone
17. 2-[3-hydroxy-4-(2H-benzotriazol-2-yl)phenoxy]-N'-methylacetyl hydrazide
18. 3-[3-hydroxy-4-(5-chloro-2H-benzotriazol-2-yl)phenylamino]-3-oxo-N'-(acetyl)propionyl hydrazide
19. 2-[3-hydroxy-4-(5-[ethoxycarbonyl]-2H-benzotriazol-2-yl)phenylthio]-N'-(butylaminocarbonyl)acetyl hydrazide
20. 5-{N-[3-hydroxy-4-(5-ethyl-2H-benzotriazol-2-yl)phenyl]-N-methylamino}-N'-methoxycarbonyl)pentanoyl hydrazide
21. N-{[3-hydroxy-4-(2H-benzotriazol-2-yl)phenylsulfinyl]butyl}-N-methylhydrazinecarboxamide
22. N-{2-[3-hydroxy-4-(5-chloro-2H-benzotriazol-2-yl)phenylsulfonyl]ethyl}-2-phenylhydrazinecarboxamide
23. 2-(2-hydroxy-5-methylphenyl)-2H-benzotriazol-5-carboxylic hydrazide
24. 2-(2-hydroxy-5-t-butylphenyl)-6-chloro-2H-benzotriazol-5-carboxylic hydrazide
25. 2-[2-hydroxy-5-(1-methyl-1-phenylethyl)phenyl]-6-methyl-2H-benzotriazol-5-carboxylic hydrazide
26. 2-(2-hydroxy-5-t-octylphenyl)-6-methoxy-2H-benzotriazol-5-carboxylic hydrazide
27. 2-(2-hydroxy-5-ethylphenyl)-6-butoxy-N'-acetyl-2H-benzotriazol-5-carboxylic hydrazide
28. 2-(2-hydroxy-5-propylphenyl)-6-(ethoxycarbonyl)-N'-benzoyl-2H-benzotriazol-5-carboxylic hydrazide
29. 2-(2-hydroxy-5-ethoxyphenyl)-6-(butylaminocarbonyl)-N'-methyl-2H-benzotriazol-5-carboxylic hydrazide
30. 2-(2-hydroxy-5-(dimethylaminocarbonyl)phenyl)-6-(diethylaminocarbonyl)-N'-phenyl-2H-benzotriazol-5-carboxylic hydrazide
31. 2-(2-hydroxy-5-butylphenyl)-6-(methoxysulfonyl)-N'-(ethoxycarbonyl)-2H-benzotriazol-5-carboxylic hydrazide
32. 2-(2-hydroxy-5-[octylaminocarbonyl]phenyl)-6-carboxy-N-(2-octylsuccinimido)-2H-benzotriazol-5-carbonamide
33. 2-(2-hydroxy-5-t-amylphenyl)-6-(aminocarbonyl)-2H-benzotriazol-5-carboxylic hydrazide, acetone hydrazone
34. 2-(2-hydroxy-5-[phenyl]phenyl)-6-sulfo-N'-lauroyl-2H-benzotriazol-5-carboxylic hydrazide.
35. 2-{2-[(2-methoxyphenylamino)-2-oxoacetamido]phenoxy}acetyl hydrazide
36. 2-{4-[(2-methoxyphenylamino)-2-oxoacetamido]phenoxy}-N'-(butylaminocarbonyl)acetyl hydrazide
37. 2-{4-[(2-methoxyphenylamino)-2-oxoacetamido]phenoxy}-N'-(butylaminocarbonyl)acetyl hydrazide
38. 2-{4-[(2-ethoxyphenylamino)-2-oxoacetamido]phenoxy}-N-(succinimido)acetamide
39. 2-{2-[(2-ethylphenylamino)-2-oxoacetamido]phenoxy}acetyl hydrazide, acetone hydrazone
40. 2-{2-[(2,4-dimethoxyphenylamino)-2-oxoacetamido]phenoxy}-N'-(benzoyl)acetyl hydrazide
41. 2-{2-[(4-butylphenylamino)-2-oxoacetamido]phenoxy}-N'-phenylacetyl hydrazide
42. 2-{2-[(2,4-dimethylphenylamino)-2-oxoacetamido]phenoxy}-N'-(ethoxycarbonyl)acetyl hydrazide
43. 2-{2-[(2-methoxyphenylamino)-2-oxoacetamido]phenoxy}acetyl hydrazide
44. 1,16-di{2-[(2-methoxyphenylamino)-2-oxoacetamido]phenyl}-2,3,5,12,14,15-hexaaza-14,13,16-tetraoxohexadecane
45. 2-{4-[(2-methoxy-5-octylphenylamino)-2-oxoacetamido]-phenylamino}acetyl hydrazide
46. 4-{3-[(2-ethoxy-5-t-butylphenylamino)-2-oxoacetamido]phenylamino}-N'-(isopropoxycarbonyl)butanoyl hydrazide
47. 4-[(2-ethoxy-5-methylphenylamino)-2-oxoacetamido]benzoyl hydrazide
48. 3-{3-[(2-butoxyphenylamino)-2-oxoacetamido]phenylamino}-N'-(benzyl)propionyl hydrazide
49. 2-{3-[(2-hexoxyphenylamino)-2-oxoacetamido]phenylthio}-N'-ethylacetyl hydrazide
50. 1,22-di{3-[(2-ethoxyphenylamino)-2-oxoacetamido]-4-methylphenylamino}-7,8,15,16-tetraaza-1,6,9,14,17,22-hexaoxodocosane
51. 3-{4-[(2-(ethylthio)phenylamino)-2-oxoacetamido]phenoxy}-N'-(3-carboxypropoxy)propionyl hydrazide
52. 2-{3-[(2-hydroxyphenylamino)-2-oxoacetamido]phenylamino}-N'-(2-dodecyl-3-carboxypropionyl)acetyl hydrazide, sodium salt 53. 2-{2-[(4-(phenyl)phenylamino)-2-oxoacetamido]-phenoxy}acetyl hydrazide 54. 2-{4-[(2-methoxy-4-(benzyl)phenylamino)-2-oxoacetamido]phenoxy}-N-(2-octylsuccinimido)acetyl hydrazide 55. 1,14-di{2-[(2-chlorophenylamino)-2-oxoacetamido]phenoxy}-3,4,11,12-tetraaza-2,5,10,13-tetraoxotetradecane 56. 2-{4-[(2-(methoxycarbonyl)phenylamino)-2-oxoacetamido]-3-methylphenoxy}acetyl hydrazide, cyclohexanone hydrazone.

Utility

The novel stabilizers of this invention are very effective additives for the stabilization of polymeric compositions which are normally subject to thermal and actinic light degradation. At times it may be beneficial to add extraneous additives generally referred to hereinafter which will act as synergists with the UV absorber groups of the compounds of this invention.

As used herein, the terms "polymer" and "polymeric composition(s)" include homopolymers or any type of copolymers.

One way in which the 2-(2-hydroxyphenyl)-2H-benzotriazole or oxanilide derivative stabilizers of the present invention can be used to stabilize polymeric compositions against degradative effects of light is by merely mixing or blending with the polymeric composition a compound of the present invention in an amount effective to stablize the polymer composition against the degradative effects of light. In this first process of stabilizing polymers, the polymeric compositions need not be, and typically are not, coreactive with the stabilizers. Thus, the stabilizers of the present invention are effective UV stabilizers even when mixed with inert polymers.

In addition to being useful in stabilizing inert polymeric compositions, the stabilizers of the present invention provide increased performance and more long-term stabilization when they are in the form of reactive additives which coreact with the polymeric compositions to be stabilized. The hydrazide functionalized UV absorbers of the present invention (where Y is NH$_2$) are reactive additives that can be attached to coreactive polymers to form polymer bound additives containing photooxidative and thermaloxidative stabilizing groups. Once reacted with the coreactive polymers, the stabilizer groups become chemically bound to the polymers and will not be lost via volatilization, migration or extraction. Non-limiting examples of coreactive polymers are those which include ester, epoxide or anhydride groups, regardless of whether such groups form part of the polymer backbone, are at the end of the polymers or are pendant from the polymer backbone.

Thus, this second aspect of the present invention relates to a polymeric compound comprising the reaction product of (a) a polymer containing at least one ester, epoxide or anhydride functional group, or combinations thereof, in the polymer backbone, on grafted side chains, as a pendant unit or combinations thereof and (b) a UV absorber compound of Formulas I or II where $R^{12}$ is hydrogen, $R^{13}$ is hydrogen, Q is a direct bond and x and z are not 0.

The novel compounds of Formula III are ester precursors used as intermediates to make certain hydrazides of Formula I having corresponding structures and substituents.

The novel stabilizers of this invention can be blended with various polymeric compositions in high concentrations to form masterbatches which can then be blended with additional polymer either of the same or different type.

The amount of stabilizer used to stabilize the polymeric composition will depend on the particular polymer system to be stabilized, the degree of stabilization desired and the presence of other stabilizers in the composition. Normally it is advisable to have about 0.01% to about 5% by weight of the UV absorber moiety of the compound of this invention present in the polymeric composition. An advantageous range is from about 0.05% to about 3% by weight of the UV absorber portion of the molecule in the final composition. In some cases about 0.5% to about 1% by weight is sufficient.

Non-limiting examples of polymeric compositions which may be stabilized by the stabilizer compounds of the present invention include:

1. Polyolefins, such as high, low and linear low density polyethylenes, which may be optionally cross-linked, polypropylene, polyisobutylene, poly(methylbutene-1), polyacetylene and, in general, polyolefins derived from monomers having from 2 to about 10 carbon atoms, and mixtures thereof.

2. Polyolefins derived from diolefins, such as polybutadiene and polyisoprene.

3. Copolymers of monoolefins or diolefins, such as ethylene-propylene, propylenebutene-1, propylene-isobutylene and ethylenebutene-1 copolymer.

4. Terpolymers of ethylene and propylene with dienes (EPDM), such as butadiene, hexadiene, dicyclopentadiene and ethylidene norbornene.

5. Copolymers of alpha-olefins with acrylic acid or methacrylic acids or their derivatives, such as ethylene-acrylic acid, ethylene-methacrylic acid and ethylene-ethyl acrylate copolymers.

6. Styrenic polymers, such as polystyrene (PS) and poly(p-methylstyrene).

7. Styrenic copolymers and terpolymers such as styrene-butadiene (SBR), styrene-allyl alcohol and styrene-acrylonitrile (SAN), styrene-acrylonitrile-methacrylate terpolymer, styrene-butadiene-styrene block copolymers (SBS), rubber modified styrenics such as styrene-acrylonitrile copolymers modified with acrylic ester polymer (ASA), graft copolymers of styrene on rubbers, such as polybutadiene (HIPS), polyisoprene or styrene-butadiene-styrene block copolymers (Stereon ™ products available from Firestone Synthetic Rubber and Latex Co.), graft copolymers of styrene-acrylonitrile on rubbers, such as butadiene (ABS), polyisoprene or styrene-butadiene-styrene block copolymers, graft copolymers of styrene-methyl methacrylate on rubbers, such as polybutadiene (MBS), butadiene-styrene radial block copolymers (e.g. KRO 3 ™ of Phillips Petroleum Co.), selectively hydrogenated butadiene-styrene block copolymers (e.g. Kraton G ™ from Shell Chemical Co.), and mixtures thereof.

8. Polymers and copolymers derived from halogen-containing vinyl monomers, such as poly(vinyl chloride), poly(vinyl fluoride), poly(vinylidene chloride), poly(vinylidene fluoride), poly(tetrafluoroethylene) (PTFE), vinyl chloride-vinyl acetate copolymers, vinylidene chloride-vinyl acetate copolymers and ethylene-tetrafluoroethylene copolymers.

9. Halogenated rubbers, such as chlorinated and/or brominated butyl rubbers or polyolefins and fluoroelastomers.

10. Polymers and copolymers derived from alpha, beta-unsaturated acids, anhydrides, esters, amides and nitriles or combinations thereof, such as polymers or copolymers of acrylic and methacrylic acids, alkyl and/or glycidyl acrylates and methacrylates, acrylamide and methacrylamide, acrylonitrile, maleic anhydride, maleimide, the various anhydride containing polymers and copolymers described in this disclosure, copolymers of the polymers set forth in this paragraph and various blends and mixtures thereof, as well as rubber modified versions of the polymers and copolymers set forth in this paragraph.

11. Polymers and copolymers derived from unsaturated alcohols or their acylated derivatives, such as poly(vinyl alcohol), poly(vinyl acetate), poly(vinyl stearate), poly(vinyl benzoate), poly(vinyl maleate), poly(vinyl butyral), poly(allyl phthalate), poly(allyl diethylene glycol carbonate) (ADC), ethylene-vinyl acetate copolymer and ethylene-vinyl alcohol copolymers.

12. Polymers and copolymers derived from unsaturated amines, such as poly(allyl melamine).

13. Polymers and copolymers derived from epoxides, such as polyethylene oxide, polypropylene oxide and copolymers thereof, as well as polymers derived from bis-glycidyl ethers.

14. Poly(phenylene oxides), poly(phenylene ethers) and modifications thereof containing grafted polystyrene or rubbers, as well as their various blends with polystyrene, rubber modified polystyrenes or nylon.

15. Polycarbonates and especially the aromatic polycarbonates, such as those derived from phosgene and bisphenols such as bisphenol-A, tetrabromobisphenol-A and tetramethylbisphenol-A.

16. Polyester derived from dicarboxylic acids and diols and/or hydroxycarboxylic acids or their corresponding lactones, such as polyalkylene phthalates (e.g. polyethylene terephthalate (PET), polybutylene terephthalate (PBT), and poly(1,4-dimethylcyclohexane terephthalate) or copolymers thereof) and polylactones such as polycaprolactone.

17. Polyarylates derived from bisphenols (e.g. bisphenol-A) and various aromatic acids, such as iso-phthalic and terephthalic acids or mixtures thereof.

18. Aromatic copolyester carbonates having carbonate as well as ester linkages present in the backbone of the polymers, such as those derived from bisphenols, iso- and terephthaloyl chlorides and phosgene.

19. Polyurethanes and polyureas.

20. Polyacetals, such as polyoxymethylenes and polyoxymethylenes which contain ethylene oxide as a comonomer.

21. Polysulfones, polyethersulfones and polyimidesulfones.

22. Polyamides and copolyamides which are derived from diamines and dicarboxylic acids and/or from aminocarboxylic acids or the corresponding lactones, such as the following nylons: 6, 6/6, 6/10, 11 and 12.

23. Polyimides, polyetherimides, polyamideimides and copolyetheresters.

24. Cross-linked polymers which are derived from aldehydes on the one hand and from phenols, ureas and melamine on the other hand, such as phenol-formaldehyde, urea-formaldehyde and melamine-formaldehyde resins.

25. Alkyl resins, such as glycerolphthalic acid resins and mixtures thereof with melamine-formaldehyde resins.

26. Blends of vinyl monomers and unsaturated polyester resins which are derived from copolyesters of saturated and unsaturated dicarboxylic acids with polyhydric alcohols, as well as from vinyl compounds (crosslinking agents) and also halogen-containing, flame resistant modifications thereof.

27. Natural polymers, such as cellulose and natural rubber, as well as the chemically modified homologous derivatives thereof, such as cellulose acetates, cellulose propionate, cellulose butyrate and the cellulose ethers, such as methyl and ethyl cellulose.

In addition, the novel stabilizers of this invention may be used to stabilize various combinations or blends of the above polymers or copolymers. They are particularly useful in the stabilization of polyolefins, acrylic coatings, styrenics, rubber modified styrenics, poly(phenylene oxides) and their various blends with styrenics, rubber-modified styrenics or nylon.

The novel ultraviolet light absorbers of this invention can be used together with other additives to further enhance the properties of the finished polymer. Examples of other additives that can be used in conjunction with the stabilizers of this invention include antioxidants, such as alkylated monophenols, alkylated hydroquinones, hydroxylated thiodiphenyl ethers, alkylidenebisphenols, hindered phenolic benzyl compounds, acylaminophenols, esters of 3-(3,5-di-t-butyl-4-hydroxyphenyl)propionic acid, esters of 3-(5-t-butyl-4-hydroxy-3-methylphenyl)propionic acid, 3-(3,5-di-t-butyl-4-hydroxyphenyl)propionic acid amides; other UV absorbers and light stabilizers such as 2-hydroxybenzophenones, benzylidene malonate esters, esters of substituted or unsubstituted benzoic acids, diphenyl acrylates, nickel chelates, oxalic acid diamides, and hindered amine light stabilizers; other additives such as metal deactivators, phosphites and phosphonites, peroxide decomposers, fillers and reinforcing agents, plasticizers, lubricants, corrosion and rust inhibitors, emulsifiers, mold release agents, carbon black, pigments, fluorescent brighteners, both organic and inorganic flame retardants and nondripping agents, melt flow improvers and antistatic agents. Numerous examples of suitable additives of the above type are given in Canadian Patent 1,190,038.

Preparative Methods

The novel UV absorber hydrazides are prepared by reacting UV absorber-substituted carboxylic acid esters and halides, sulfonic acid esters and sulfonyl halides with hydrazine or hydrazine hydrate. Typically the ester is dissolved in a polar solvent and converted to the desired hydrazide by stirring with an equivalent amount or slight excess of hydrazine or hydrazine hydrate. The reaction may proceed at room temperature or may require heating. Preferably, the hydrazinolysis reaction is carried out in methanol or ethanol at about 10° C. to about 30° C., but other solvents, such as isopropanol or ethylene glycol, are also acceptable. In most cases the resulting hydrazides can be purified by recrystallization from the lower alcohols. Substituted hydrazides can be prepared by reacting the esters with substituted hydrazines.

Suitable benzotriazole-substituted carboxylic acid esters and oxanilide-substituted carboxylic acid esters are described in U.S. Pat. Nos. 3,218,332 and 3,906,966, British Patent Application Publication Nos. 2,197,318 A, 2,188,631 A and 2,196,966 A, and French Patent 1,506,632. Other benzotriazole-substituted carboxylic acid esters and oxanilide-substituted carboxylic acid esters may be prepared according to the following examples.

A. Reacting hydroxy, amino or thio substituted benzotriazoles with chloro-substituted or bromo-substituted acid esters in the presence of an acid acceptor (e.g. potassium carbonate, tertiary amine) and optionally in the presence of alkylation catalysts (e.g. aminopyridines, potassium iodide):

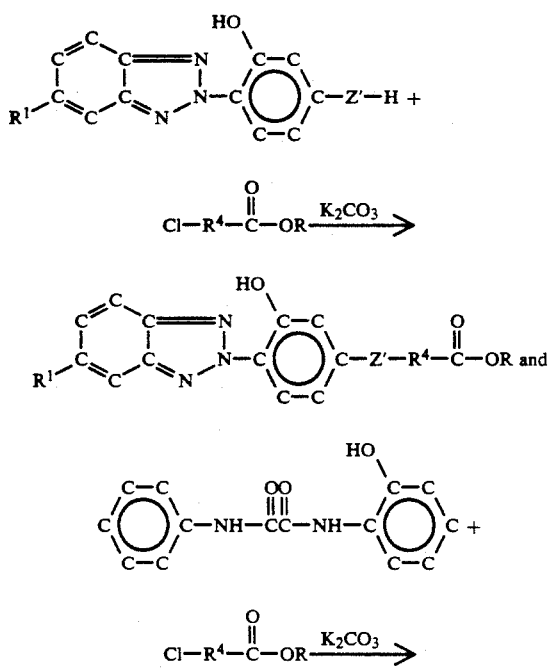

where Z' is —O—, —N(R⁷)— or —S—, R is lower alkyl of 1-4 carbons or phenyl and $R^1$ and $R^4$ are as previously defined.

B. Esterifying benzotriazole-substituted acids and oxanilide-substituted acids. The preparation of such acids and esters are described in U.S. Pat. Nos. 3,399,173, 3,766,205, 3,629,191, 3,862,087, 3,214,436 and European Patent Application Publication No. 57,160.

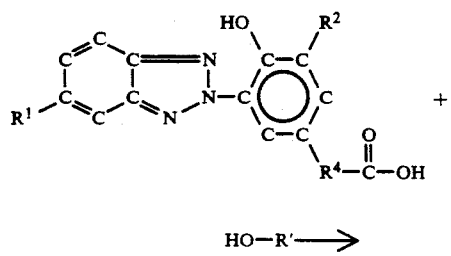

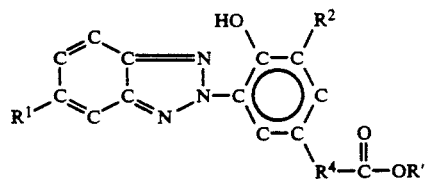

where R' is lower alkyl of 1-4 carbons or allyl, and $R^1$, $R^2$ and $R^4$ are as previously defined.

C. Reacting aminoalkyl-substituted benzotriazoles with mono ester acid chlorides of dicarboxylic acids.

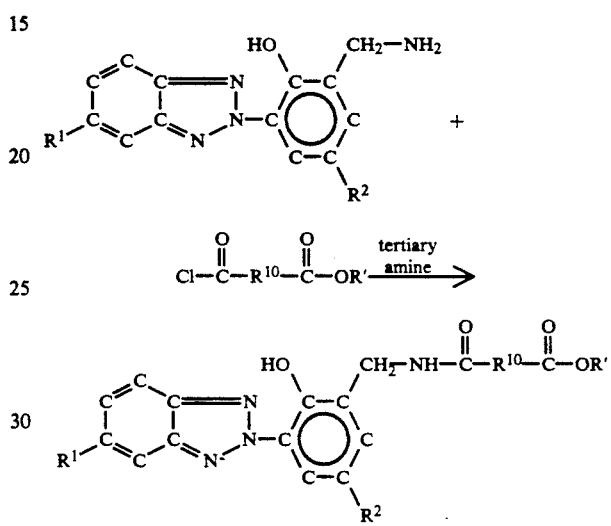

where R', $R^1$, $R^2$ and $R^{10}$ are as previously defined. Esters of this type, where $R^{10}$ is 1,2-ethanediyl are disclosed in U.S. Pat. No. 3,629,192. When $R^{10}$ is a direct bond, such esters may also be prepared by reaction with lower dialkyl oxalate or diphenyl oxalate.

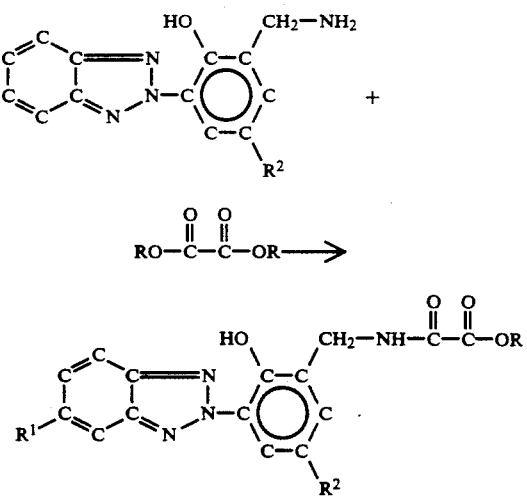

where R, $R^1$ and $R^2$ are as previously defined. The preparation of the aminoalkyl-substituted benzotriazoles are described in U.S. Pat. Nos. 3,862,087 and 3,629,192.

D. Reacting amino-substituted-benzotriazoles and oxanilides with mono ester acid chlorides of dicarboxylic acids.

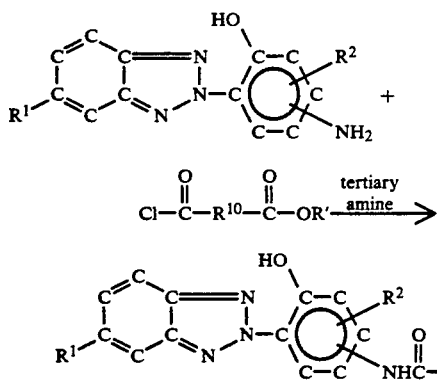

The amino-substituted benzotriazoles are described in U.S. Pat. Nos. 3,272,891 and 3,159,646.

Non-limiting examples of suitable hydrazines include hydrazine, hydrazine hydrate, 35-85% hydrazine hydrate, methylhydrazine, ethylhydrazine, propylhydrazine, isopropylhydrazine, n-butylhydrazine, sec-butylhydrazine, n-amylhydrazine, sec-amylhydrazine, n-hexylhydrazine, and n-octylhydrazine, t-butylhydrazine, phenylhydrazine, benzylhydrazine and sec-octylhydrazine.

Hydrazone derivatives of this invention are prepared by reacting the hydrazides with ketones, aldehydes or formaldehyde in inert solvents, preferably in hydrocarbon solvents under azeotropic conditions. They may also be prepared by reacting hydrazones of ketones or aldehydes with UV absorber-containing esters.

The novel carbamoyl and thiocarbamoyl derivatives are prepared by reacting the hydrazides with isocyanates, disocyanates, isothiocyanates or diisothiocyanates in aprotic polar solvents, such as tetrahydrofuran or dimethylformamide.

The reactions of hydrazides with ketones, aldehydes, isocyanates, diisocyanates, isothiocyanates, and diisothiocyanates are well known in the art and can occur under a wide variety of temperatures, times, solvents and concentrations. Generally a mole ratio of 0.9:1.0 to 1.1:1.0 of the hydrazide to the monofunctinal coreactant is employed. If the coreactant is difunctional, then a mole ratio of 1.8:2.0 to 1.1:1.0 of the hydrazide to the difunctional coreactant is employed. If the coreactant is a compound that can easily be removed from the product, e.g. acetone or methyl ethyl ketone, lower mole ratios may be desirable. The coreactant may be used as the solvent.

The hydrazides also react with unsubstituted or N-substituted amic acid esters in lower alcohol solutions to form 1,2-amoyl hydrazines. The reactions are normally carried out in refluxing alcohol (i.e. methanol) but may be carried out in higher boiling aprotic solvents or without solvent by heating a mixture of the two components above their melting points. The methyl and ethyl esters of N-substituted oxamates and succinamates are the preferred coreactants.

The novel acyl derivatives of the hydrazide may be prepared by reacting the esters with acid hydrazides in refluxing alcohol (i.e. methanol).

The novel alkoxycarbonyl, cycloalkoxycarbonyl, aryloxycarbonyl and aralkoxycarbonyl derivatives of the hdyrazides may be prepared by reacting the ester (as described above) with the corresponding alkyl, cycloalkyl, aryl or aralkyl carbazates in refluxing alcohol (i.e. methanol). Alternately, these derivatives may be prepared by reacting the hydrazide with a disubstituted carbonate or substituted haloformate. When a haloformate is used, an additional base (inorganic or amine) may be used to react with the halogen acid formed.

The novel sulfonyl derivatives of the hydrazides may be prepared by reacting the esters with the corresponding sulfonyl hydrazide.

The novel alkyl derivatives of the hydrazides may be prepared by reacting the hydrazides with epoxides. The reactions are generally carried out neat or in a minimum amount of a high boiling solvent. Reaction generally occurs quite readily at about 140° C. to about 150° C.

The hydrazide group reacts with two equivalents of epoxide. The ratio of the unsubstituted hydrazide to the monoalkylated and dialkylated products is dependent upon the mole ratio of epoxide to hydrazide, the temperature and the concentration, if the reaction is run in a solvent.

Non-limiting examples of suitable ketones include acetone, methyl ethyl ketone, 2-pentanone, 2-hexanone, 3-hexanone, 2-decanone, 3-methyl-2-pentanone, 4-methyl-2-pentanone, 4-methoxy-4-methyl-2-pentanone, cyclopentanone, cyclohexanone, 2,4-dimethyl-4-heptanone, 3,5-dimethyl-4-heptanone, 2,4-dimethyl-3-pentanone, 1,3-diphenylacetone, 2-octanone, 3-octanone, dihydroisophorone, 4-t-butylcyclohexanone, methyl cyclohexyl ketone, acetophenone, 2,2,6,6-tetramethyl-4-piperidone and 2,6-diethyl-2,3,6-trimethyl-4-piperidone.

Non-limiting examples of suitable aldehydes include formaldehyde, acetaldehyde, butyraldehyde, dodecyl aldehyde, 2-ethylbutyraldehyde, heptaldehyde, isobutyraldehyde, isovaleraldehyde, octyl aldehyde, propionaldehyde, benzaldehyde, 3,5-di-t-butyl-4-hydroxybenzaldehyde, 2,3-dimethyl-p-anisaldehyde, 3-hydroxybenzaldehyde, 1-naphthaldehyde, salicylaldehyde, p-tolualdehyde and 2,3,4-trimethoxybenzaldehyde.

Non-limiting examples of suitable isocyanates include allyl isocyanate, benzyl isocyanate, n-butyl isocyanate, sec-butyl isocyanate, isobutyl isocyanate, t-butyl isocyanate, cyclohexyl isocyanate, ethyl isocyanate, isopropyl isocyanate, 4-methoxyphenyl isocyanate, methyl isocyanate, octadecyl isocyanate, 1-naphthyl isocyanate, phenyl isocyanate, o-tolyl isocyanate, m-tolylisocyanate and p-tolyl isocyanate, dimethyl-m-isopropenylbenzyl isocyanate and 2-isocyanatoethyl methacrylate.

Non-limiting examples of suitable isothiocyanates include allyl isothiocyanate, benzyl isothiocyanate, 4-bromophenyl isothiocyanate, n-butyl isothiocyanate, sec-butyl isothiocyanate, isobutyl isothiocyanate, t-butyl isothiocyanate, 3-chlorophenyl isothiocyanate, cyclohexyl isothiocyanate, ethyl isothiocyanate, methyl isothiocyanate, propyl isothiocyanate, isopropyl isothiocyanate, 1-naphthyl isothiocyanate, t-octyl isothiocyanate, phenethyl isothiocyanate, phenyl isothiocyanate, propyl isothiocyanate, o-tolyl isothiocyanate, m-tolyl isthiocyanate and p-tolyl isothiocyanates.

Non-limiting examples of suitable amic acid esters include methyl oxamate, ethyl oxamate, propyl oxamate, isopropyl oxamate, n-butyl oxamate, phenyl oxamate, methyl succinamates, ethyl succinamate, propyl succinamate, isopropyl succinamate, n-butyl succinamate, phenyl succinamate, ethyl N-(2,2,6,6-tetramethyl-4-piperidinyl)oxamate, methyl N-(2,2,6,6-tetramethyl-4-piperidinyl)oxamate, ethyl N-(2,2,6,6-tetramethyl-4-piperidinyl)succinamate, methyl N-(2,2,6,6-tetramethyl-4-piperidinyl)succinamate, ethyl N-(3,5-di-t-butyl-4- hydroxyphenyl)oxamate, methyl N-(3,5-di-t-butyl-4-hydroxyphenyl)oxamate, ethyl N-(3,5-di-t-butyl-4-hydroxyphenyl)succinamate and methyl N-(3,5-di-t-butyl-4-hydroxyphenyl)succinamate.

Non-limiting examples of suitable acid hydrazides include acetyl hydrazide, propionic hydrazide, butyric hydrazide, isobutyrichydrazide, valeric hydrazide, isovaleric hydrazide, caproic hydrazide, decanoic hydrazide, lauric hydrazide, stearic hydrazide, benzhydrazide, 3,5-di-t-butyl-4-hydroxybenzhydrazide, 3-(3,5-di-t-butyl-4-hydroxyphenyl)propionic acid hydrazide, 3-(n-hexylthio)propionic acid hydrazide, (4-benzoyl-3-hydroxyphenoxy)acetyl hydrazide and 3-(dimethylaminoethylthio)propionic acid hydrazide.

Non-limiting examples of suitable carbazates include ethyl carbazate, methyl carbazate, propyl carbazate, isopropyl carbazate, butyl carbazate, cyclohexyl carbazate, cyclopentyl carbazate, cyclododecyl carbazate, phenyl carbazate, benzyl carbazate, 4-t-butylcyclohexyl carbazate, 2-ethylhexyl carbazate, 4-methylphenyl carbazate and 3-methoxyphenyl carbazate.

Non-limiting examples of suitable diaryl carbonates include diphenyl carbonate, di-(4-methylphenyl) carbonate, di-(3-methylphenyl) carbonate, di-(3-methoxyphenyl) carbonate, di-(2,6-dimethylphenyl) carbonate and di-(2,5-di-t-butylphenyl) carbonate.

Non-limiting examples of suitable sulfonyl halides include benzenesulfonyl hydrazide, 4-bromobenzenesulfonyl hydrazide, 1-butanesulfonyl hydrazide, 4-t-butylbenzenesulfonyl hydrazide, p-toluenesulfonyl hydrazide, ethanesulfonyl hydrazide, methanesulfonyl hydrazide, 4-fluorobenzenesulfonyl hydrazide, 1-hexadecanesulfonyl hydrazide, isopropanesulfonyl hydrazide and 1-naphthalenesulfonyl hydrazide.

Non-limiting examples of suitable epoxides include 1,2-epoxybutane, 2,3-epoxybutane, 1,2-epoxycyclododecane, 1,2-epoxycyclohexane, 1,2-epoxyoctane, 1,2-epoxydecane, 1,2-epoxydodecane, 1,2-epoxyoctadecane, 1,2-epoxy-3-phenoxypropane, 2,3-epoxypropyl acrylate, 2,3-epoxypropyl methacrylate, 2,3-epoxyproyl 4-methoxyphenyl ether, glycidyl isopropyl ether, glycidyl n-hexyly ether, glycidyl dodecyl ether and glycidyl octadecyl ether.

The following examples are presented to provide a more detailed explanation of the present invention and are intended as illustrations and not limitations of the invention. Unless otherwise stated herein, the temperatures are in degrees Centigrade and all parts are by weight.

EXAMPLE I

Preparation of
2-(2-[(phenylamino)-2-oxoacetamido]phenoxy)acetyl hydrazide

Into a 125 ml flask were placed N-phenyl-N'-(2-[ethoxycarbonylmethoxy]phenyl)oxamide (2.0 g, 0.006 mole), 35 ml methanol, 35 ml tetrahydrofuran (THF) and 10 ml 54% aqueous hydrazine. The mixture was stirred at room temperature for 2 hrs. during which time a solid precipitated. The solid was isolated by filtration, slurried with 150 ml water and filtered, then slurried with 75 ml methanol and filtered again and air dried on the filter giving 1.0 g of white solid (m.p. 183°-186° C.). The THF/methanol filtrate was stripped using aspirator vacuum to give a tan solid residue. This residue was slurried with 10 ml THF and filtered again. The solid was dried on the filter giving 0.5 g of slightly tan solid (m.p. 179°-182° C.). The samples were shown to be the same by infrared spectra and were combined. The infrared spectrum showed an NH band at 3300 cm$^{-1}$ and carbonyl bands at 1670 and 1600 cm$^{-1}$. The ester carbonyl of the starting material (1750 cm$^{-1}$) was not present.

EXAMPLE II

Preparation of
N-[(3-[2H-benzotriazol-2-yl]-2-hydroxy-4-methyl)benzyl]-3-piperidinecarboxylic hydrazide

A. Preparation of ethyl
N-[(3-[2H-benzotriazol-2-yl]-2-hydroxy-4-methyl)benzyl]-3-piperidine carboxylate 2-(2-hydroxy-4-methylphenyl)-2H-benzotriazole (42.8 g, 0.19 mole) and n-butanol (50 ml) were slurried in a reaction flask under a nitrogen atmosphere at room temperature. Ethyl nipecotate (44.8 g, 0.28 mole) and paraformaldehyde (9.7 g, 0.32 equiv.) were added, the paraformaldehyde addition causing as 4° C. rise in the temperature. The reaction was heated to 101° C. over 40 min. dissolving the solids. The reaction was maintained at this temperature for 24 hrs. The reaction mixture was stirred with 250 ml water and 250 ml methylene chloride. The phases were separated and the organic phase washed twice with 200 ml portions of water. The organic solution was dried with anhydrous sodium sulfate and magnesium sulfate and stripped using aspirator vacuum. The residual yellow oil weighed 104 g. Liquid chromatographic assay showed about 60% of the title compound, about 30% n-butanol and about 4% starting benzotriazole. Upon prolonged cold storage, a solid precipitated. Some of this solid was isolated by filtration, slurried in methanol and filtered, then washed with methyl t-butyl ether. The resulting slightly yellow solid had a m.p. of 87°-90° C. The infrared spectra of both the original oil and the isolated solid showed a carbonyl peak at 1720 cm$^{-1}$.

B. Preparation of
N-[(3-(2H-benzotriazol-2-yl)-2-hydroxy-4-methyl)benzyl]-3-piperidinecarboxylic hydrazide The crude ester prepared in Step A of this Example (84 g) was slurried with 100 ml methanol in a flask under nitrogen atmosphere at room temperature. Hydrazine hydrate (85% aqueous, 50 ml, 0.85 mole) was added over 10 min at 26°-29° C. The reaction was heated to reflu. (77° C.) over 50 min., dissolving the ester. After refluxing 2.5 hrs., solids began precipitating, thickening the reaction mixture. Additional methanol, 100 ml, was added and the mixture refluxed for a total of 11 hrs. The mixture was stirred with 500-600 ml water and the solid isolated by filtration. The solid was slurried with 350 ml methyl t-butyl ether and filtered, then washed with 250 ml water and filtered. The residual moisture was evaporated under reduced pressure. The off-white solid weighed 45.5 g and had a m.p. of 189°-192° C.

EXAMPLE III

Preparation of
2-([2-hydroxy-3-(2H-benzotriazol-2-yl)-5-methyl-phenyl]methylamino)-2-oxoacetyl hydrazide

A. Preparation of ethyl 2-([2-hydroxy-3-(2H-benzotriazol-2-yl)-5-methyl-phenyl]methylamino)-2-oxoacetate

(1) From ethyl oxalyl chloride 2-(2-hydroxy-3-aminomethyl-5-methyl)-2H-benzotriazole (50.8 g, 0.2 mole) was slurried with 600 ml methylene chloride. Triethylamine (22.2 g, 0.2 mole) was added. Ethyl oxalyl chloride (27.4 g, 0.2 mole) diluted with 120 ml methylene chloride was added slowly over 20 min., causing the temperature to rise from 23° C. to 38° C. The slurry was present throughout this addition, most solids dissolving shortly after complete addition. The reaction was continued 18 hrs. at room temperature. The reaction mixture was filtered of insolubles and transferred to a separatory funnel and washed with 400 ml water, then 400 ml 5% aq. HCl (emulsion at interface), then 400 ml water (emulsion at interface). The emulsified interfaces were isolated, diluted with water and the organic solution which separated was returned to the main organic solution. The solvent was stripped under reduced pressure yielding a solid which was washed with 600 ml methanol and dried on the filter. The product weighed 55.5 g and had a melting point of 148°-152° C.

(2) From diethyl oxalate

Diethyl oxalate (8.8 g, 0.06 mole) was placed in a flask and diluted with 150 ml methanol. 2-(2-Hydroxy-3-aminomethyl-5-methyl)-2H-benzotriazole (13.5 g, 0.05 mole) was added and the solution stirred for 2 hrs. at room temperature, during which time the benzotriazole slowly dissolved and was replaced by the precipitating product. The solid was filtered, rinsed with methanol and air dried. The product weighed 14.6 g and had a m.p. of 160°-166° C.

B. Preparation of 2-{[2-hydroxy-3-(2H-benzotriazol-2-yl)-5-methyl-phenyl]methyl}amino-2-oxoacetyl hydrazide The ester prepared by either procedure (1) or (2) of Step A of this Example (82.6 g, 0.23 mole) was slurried with 1200 ml methanol. To this was added 54% aq. hydrazine (27.3 g, 0.46 mole) and another 400 ml methanol to facilitate stirring of the slurry. The reaction was allowed to stir for 2 hrs. The solid was filtered and the solid was air dried. The product weighed 94.9 g and had a m.p. of 256°-262° C. An infrared spectrum of the product showed two carbonyl peaks at 1625 and 1645 cm$^{-1}$.

EXAMPLE IV

Preparation of
3-[3-(2H-benzotriazol-2-yl)-4-hydroxy-5-t-butyl-phenyl]propionyl hydrazide Polyethylene glycol ester with 3-[3-(2H-benzotriazol-2-yl)-4-hydroxy-5-t-butylphenyl]propionic acid (Tinuvin 1130, a product of CibaGeigy) (332 g, about 0.51 mole) was mixed with 335 ml methanol (two liquid phases). To this was added 54% aq. hydrazine (60 g, 0.1 mole). The reaction was heated to 40° C., forming a homogeneous solution. This temperature was maintained for 1 hr. and the progress followed by infrared spectroscopy (ester carbonyl converting to hydrazide carbonyl). The mixture was then refluxed for 3.5 hrs. The solid which had formed was filtered and washed with 400 ml fresh methanol, giving 155.3 g product having a m.p. of 171°-175° C. The filtrate was checked by IR spectrum, showing unreacted ester. The filtrate was mixed with additional 54% hydrazine (10 g, 1.18 mole total) and refluxed for 1.5 hrs. The methanol wash from the above rinse was concentrated to about 100 ml and added to the refluxing filtrate. The reaction was refluxed for 1 hr. more, then allowed to cool and stand while the product precipitated. The product was filtered and air dried giving another 36.0 g product having a m.p. of 172°-180° C.

EXAMPLE V

Preparation of
4-{[2-hydroxy-3-(2H-benzotriazol-2-yl)-5-methyl-phenyl]methylamino}-4-oxobutanoyl hydrazide

A. Preparation of Ethyl 4-{[2-hydroxy-3-(2H-benzotriazol-2-yl)-5-methyl-phenyl]methylamino}-4-oxobutanoate Into a 250 ml flask were placed 2-(2-hydroxy-3-aminomethyl-5-methylphenyl)-2H-benzotriazole (14.1 g, 0.05 mole), 125 ml methylene chloride and triethylamine (6.0 g, 0.06 mole). Ethyl succinyl chloride (8.6 g, 0.052 mole) diluted with 25 ml methylene chloride was added slowly over 5 min. causing the temperature to rise from 24° C. to 42° C. (refluxed). The reaction mixture was stirred 30 min. at room temperature, heated to reflux and refluxed 30 min. The reaction insolubles were filtered hot and the filtrate was transferred to a 500 ml separatory funnel. It was washed with 100 ml water, then 100 ml 5% aq. HCl (emulsion at interface), then 100 ml water (3 times until reaching a pH of 6). The solvent was stripped under reduced pressure, yielding a solid which was air dried. The product weighed 13.3 g, and had a melting point of 147°-150° C. The infrared spectrum showed a strong sharp OH band at 3310 cm$^{-1}$, a strong sharp carbonyl band at 1640 cm$^{-1}$, and a medium broad carbonyl band at 1545 cm$^{-1}$.

B. Preparation of 4-{[2-hydroxy-3-(2H-benzotriazol-2-yl)-5-methyl-phenyl]methylamino}-4-oxobutanoyl hydrazide The ester prepared in Step A of this Example (13.95 g, 0.038 mole) was slurried in 150 ml of methanol in a 500 ml flask. Added to the ester was 54% hydrazine (5 g, 0.084 mole). Shortly after addition the reaction gelled. Methanol (50 ml) was added to dilute the reaction. The reaction was heated to reflux, and refluxed for 1.5 hrs., then cooled and allowed to stand 16 hrs. The reaction was again heated to reflux and refluxed for 2 hrs. The insolubles were filtered from the hot (60° C.) solution. The filtrate was reduced in volume by distillation (144 ml removed). The solution was cooled to 60° C., and solids filtered. A precipitate formed in the filtrate and this was isolated by another filtration. The combined solids were air dried and weighed 1.5 g and had a m.p. of 212°-216° C. The infrared spectrum showed a strong OH band at 3295 cm$^{-1}$, a strong sharp carbonyl band at 1635 cm$^{-1}$, and a medium sharp carbonyl band at 1550 cm$^{-1}$, with a weak shoulder at 1510 cm$^{-1}$.

EXAMPLE VI

Reaction of the Hydrazide of Example IV with 2-Ethylhexyl Glycidyl Ether

The hydrazide of Example IV (8.83 g, 0.025 mole) and 2-ethylhexyl glycidyl ether (4.65 g, 0.025 mole) were combined in a flask without solvent. The mixture was heated to 160° C., with the mixture liquifying at 145° C. The mixture was heated for 1 hr. between 160°-170° C. The reaction was cooled and slurried with 400 ml methanol. The solid that was formed (1.6 g) was removed by filtration. The methanol filtrate was stripped under reduced pressure, leaving 8.6 g of a yellow, viscous liquid. Liquid chromatographic analysis of the product indicasted it was a mixture of the starting hydrazide and the monoalkylated and dialkylated products.

EXAMPLE VII

Reaction of the Hydrazide of Example IV with Kraton FG 1910 X TM

Kraton FG 1901 X TM (a sytrene/butadiene block copolymer grafted with 2% maleic anhydride, a product of Shell Chemical Company) (30.0 g, 0.006 maleic anhydride equiv.) was added to 300 ml of hot xylene (122° C.) After the polymer dissolved, the hydrazide of Example IV (2.2 g, 0.006 mole) was added. The mixture was heated to reflux, and azeotropically distilled for 3 hrs. (no water formation noted). The xylene (125 ml) was distilled from the reaction. The mixture was cooled and stirred with 700 ml methanol for 1 hr. The solids which formed were filtered. The solids were processed for 2 min. in 500 ml methanol using a Waring blender. The solids were filtered, giving a weight of 22.6 g. The infrared spectrum (nujol mull) showed an imide band at 1730 cm$^{-1}$.

EXAMPLE VIII

Reaction of the Hydrazide of Example IV with Epolene E43 TM

Epolene E43 TM (polypropylene grafted with 6-7% maleic anhydride, a product of Eastman Chemical Company) (50 g, 0.03-0.05 maleic anhydride equiv.) was added to 300 ml hot stirred xylene (110° C.) in a flask. After the Epolene dissolved, the hydrazide of Example IV was slowly added at 120° C. The mixture was heated to reflux, azeotropically distilling off all the water (collected 0.7 ml) over 1.5 hrs. The reaction mixture was clear yellow. The reaction was cooled and the solvent stripped under pressure yielding a solid weighing 55.53 g and having a m.p. of 130°-136° C. The infrared spectrum (xylene solution) showed a strong sharp imide band at 1730 cm$^{-1}$, and a very weak amic acid band at 1755 cm$^{-1}$.

EXAMPLE IX

Preparation of 3-[3-(2H-benzotriazol-2-yl)-4-hydroxy-5-t-butylphenyl]-N'-(butylaminocarbonyl)propionyl hydrazide The hydrazide of Example IV (17.05 g, 0.05 mole) was diluted with 200 ml THF in a 500 ml flask. Butyl isocyanate (5.0 g, 0.05 mole) diluted with 25 ml THF was added to the hydrazide over 5 min. causing the temperature to rise from 23° C. to 28° C. The mixture was heated to reflux, clearing the initally milky white solution. The reaction was refluxed for 1 hr, then cooled to room temperature and stripped of solvent under reduced pressure to yield a solid weighing 20.4 g and having a m.p. of 166°-170° C. The infrared spectrum showed a strong carbonyl band at 1670 cm$^{-1}$ with a weak shoulder at 1655 cm$^{-1}$.

EXAMPLE X

Preparation of the 2-Butanone Hydrazone of the Hydrazide of Example IV

The hydrazide of Example IV (17.05 g, 0.05 mole) and 250 ml xylene were combined in a flask. 2-Butanone (5.4 g, 0.075 mole) was added to the stirring solution. The mixture was heated to reflux over 1 hr, cooled, then heated to azeotropically distill for 2 hrs., until water stopped coming over (collected 0.5 ml). The solution was initially milky white, but turned clear at 105° C. The solution was cooled, and the solid filtered. The filter cake was washed with hexane and dried, leaving a powder weighing 16.8 g, with a m.p. of 168°-173° C. The infrared spectrum (nujol mull) showed a strong carbonyl band at 1660 cm$^{-1}$.

EXAMPLE XI

Reaction of the Hydrazide of Example IV with PA-18 TM

PA-18 TM (an octadecene-maleic anhydride copolymer product of Chevron Chemical Company) (21.9 g, 0.0625 mole) was added to hot xylene (100° C.) in a 500 ml flask. The polymer solution was heated to 120° C. and the hydrazide of Example IV (17.05 g, 0.05 mole) was added over 1 min. The mixture was azeotropically distilled for 1.5 hrs. (collected 0.8 g water). The reaction was stripped under reduced pressure, yielding a solid weighing 35.3 g, and having a m.p. of 120°-124° C. The infrared spectrum (nujol mull) showed two strong sharp carbonyl bands at 1725 cm$^{-1}$ and 1610 cm$^{-1}$.

EXAMPLE XII

Reaction of the Hydrazide of Example IV with SMA 3000 TM

SMA 3000 TM (a styrene/maleic anhydride copolymer product of ARCO Chemical Company) (26.8 g, 0.0654 mole) was added to 250 ml hot xylene (100° C.) in a 500 ml flask. The polymer was heated to 120° C. for the slow addition of the hydrazide of Example IV (20.5 g, 0.06 mole). The mixture was azeotropically distilled for 1.5 hrs. (collected 0.9 ml water). The solution was cooled to 100° C., then stripped of solvent under reduced pressure, yielding a solid that weighed 45.9 g, and had a m.p. of 195°-199° C. The infrared spectrum (xylene solution) showed a strong sharp carbonyl band at 1725 cm$^{-1}$ (imide) and a weak carbonyl band at 1780 cm$^{-1}$ (residual anhydride).

EXAMPLE XIII

Preparation of 3-[3-(2H-benzotriazol-2-yl)-4-hydroxy-5-t-butylphenyl]-N-(2-octadecylsuccinimido)propanamide Octadecyl succinic anhydride (17.6 g, 0.05 mole) was placed in a 500 ml flask and diluted with 75 ml xylene. The solution was heated to azeotropically distill for 1 hr then cooled to 120° C. Additional xylene (175 ml) was added. At 130° C., the hydrazide of Example IV 17.05 g, 0.05 mole) was slowly added. The mixture was azeotropically distilled for 2 hrs. The reaction was cooled and the solvent stripped off under reduced pressure, leaving a viscous liquid. The liquid was placed on dry ice, causing solidification. The solid weighed 29.7 g, and had a m.p. of 117°-121° C. The infrared spectrum (nujol mull) showed a strong sharp imide carbonyl band at 1730 cm$^{-1}$, with a shoulder at 1675 cm$^{-1}$.

EXAMPLE XIV

Reaction of the Hydrazide of Example III with Epolene E43 ™

Epolene E-43 ™ (50 g, 0.018 mole) was added to 500 ml hot xylene (100° C.). The hydrazide of Example III (6.2 g, 0.018 mole) was added at 110° C. The reaction was azeotropically distilled for 1.5 hrs. (collected 0.6 g water). The reaction mixture was cooled and the precipitate filtered. The product weighed 27.4 g and had a m.p. of 139°-144° C. The infrared spectrum (xylene solution) showed a weak anhydride band at 1775 cm$^{-1}$, also a weak imide band at 1735 cm$^{-1}$, with an amide shoulder at 1700 cm$^{-1}$.

EXAMPLE XV

Preparation of 2-([2-hydroxy-3-(2H-benzotriazol-2-yl)-5-methylphenyl]methylamino)-2-oxo-N'-(3-carboxypropenoyl)acetyl hydrazide Maleic anhydride (2.45 g, 0 025 mole) and 250 ml THF were combined in a 500 ml flask equipped with a Dean Stark water separation assembly. The hydrazide of Example III (8.5 g, 0.025 mole) was added accompanied by a rise in temperature from 24° C. to 29° C. The mixture was heated to reflux and refluxed for 1 hr., then cooled. The solid was filtered and rinsed with 250 ml THF. The filtrate and the rinsing solvent were placed in a flask and heated. As the THF distilled, it was replaced with xylene (200 ml). When the solution temperature reached 135° C. the reaction was allowed to reflux 1 hour. The reaction mixture was cooled to 80° C. and the solid was filtered and dried in air. The product weighed 7.5 g and had a m.p. of 198°-210° C. The infrared specturm showed a strong carbonyl band at 1635 cm$^{-1}$.

EXAMPLE XVI

Preparation of 2-([2-hydroxy-3-(2H-benzotriazol-2-yl)-5-methylphenyl]methylamino)-2-oxo-N-(2-octadecylsuccinimido)acetamide Octadecylsuccinic anhydride (17.6 g, 0.05 mole) and 250 ml xylene were combined in a 500 ml flask equipped with a Dean Stark water separation asembly. The mixture was warmed to 100° C. for the incremental addition of the hydrazide of Example III (17.0 g, 0.05 mole). Each portion gelled the reaction mixture and the temperature was raised to 130° C. between additions to thin the mixture. After completion, the reaction was refluxed for 1 hr. (collected 1.1 ml water). The reaction mixture was cooled to 80° C. and the insolubles removed by filtration. Upon cooling to room temperature, some of the product precipitated and was isolated by filtration, giving 6.9 g of solid with a m.p. of 104°-108° C. The filtrate was stripped under reduced pressure, leaving a viscous liquid. The liquid was solidified by cooling on dry ice for 30 min. The fine light yellow solid weighed 19.0 g and had a m.p. of 106°-110° C. The combined product weighed 25.9 g. The infrared spectrum (xylene solution) showed two sharp carbonyl bands at 1735 and 1685 cm$^{-1}$.

EXAMPLE XVII

Preparation of 2-([2-hydroxy-3-(2H-benzotriazol-2-yl)-5-methylphenyl]methylamino)-2-oxo-N'-(butylaminocarbonyl)acetyl hydrazide The hydrazide of Example III (8.6 g, 0.025 mol) was slurried with 200 ml THF in a 500 ml flask. Butyl isocyanate (2.5 g, 0.025 mole) in 25 ml THF was added and the mixture heated to reflux for 3 hrs. The mixture was cooled and the solid filtered. The solid was allowed to air dry yielding 8.0 g of product having a m.p. of 201°-203° C. The infrared spectrum showed a weak carbonyl band at 1725 cm$^{-1}$ and two strong carbonyl bands at 1690 and 1645 cm$^{-1}$.

EXAMPLE XVIII

Preparation of 2-([2-hydroxy-3-(2H-benzotriazol-2-yl)-5-methylphenyl]methylamino)-2-oxo-N'-(octadecylaminocarbonyl)acetyl hydrazide The hydrazide of Example III (8.6 g, 0.025 mol) was slurried with 250 ml THF in a 500 ml flask. Octadecyl isocyanate (7.4 g, 0.025 mole) in 25 ml THF was added and the mixture stirred at room temperature for 30 min., then heated to reflux for hrs. The mixture was filtered hot (100° C). The solid weighed 8.1 g and had a m.p. of 185°-190° C. Upon standing, additional solid precipitated from the filtrate. This, too, was isolated by filtration, giving 2.1 g more product with a m.p. of 185°-190° C. (total product 10.2 g). The infrared spectra of the two samples agreed, each having two strong sharp carbonyl bands at 1635 and 1685 cm$^{-1}$ with a shoulder at 1720 cm$^{-1}$.

EXAMPLE XIX

Reaction of the Hydrazide of Example III with PA-18 ™

Xylene (300 ml) was heated to 100°-110° C. in a 500 ml flask equipped with a Dean Stark water separation assembly. PA-18 ™ (21.9 g, 0.0625 maleic anhydride equiv.) was added. The mixture was cooled to 80° C. for the addition of the hydrazide of Example III (17.0 g, 0.05 mole) incrementally over 90 minutes, allowing the hydrazide to dissolve between portions. After half the hydrazide was added, the reaction was heated to reflux to remove the water that formed. The reaction was cooled to 120° C. for the addition of the remaining hydrazide. The reaction was refluxed with azeotropic removal of water for 2 hrs. The reaction was cooled to 120° C. and the insolubles filtered, then cooled to room temperature and filtered again. The filtrate was stripped of solvent under reduced pressure to give 35.2 g of product having a m.p. of 156°-160° C. The infrared spectrum showed a weak carbonyl band at 1780 cm$^{-1}$ (anhydride) and strong carbonyl bands at 1730 and 1685 cm$^{-1}$.

EXAMPLE XX

Reaction of the Hydrazide of Example II with PA-18 ™

PA-18 ™ (11.0 g, 0.031 maleic anhydride eq.) was dissolved in 250 ml hot xylene in a 500 ml flask equipped with a Dean Stark water separation assembly. The polymer solution was heated to reflux for the addition of the hydrazide of Example II (9.5 g, 0.025 mole) in 3 portions over 30 min. After the addition, the reaction was azeotropically distilled to remove water for 90 min. (0.4-0.45 ml water collected). The solution was cooled to 100° C. and the solvent stripped under reduced pressure. The residue weighed 20.7 g and was pulverized in a mortar and pestle to form a light yellow powder (18.8 g). The infrared spectrum (xylene solution) showed a strong carbonyl band at 1725 cm$^{-1}$ (imide).

The present invention may be embodied in other specific forms without departing from the spirit or essential attributes thereof and, accordingly, reference should be made to the appended claims, rather than to the foregoing specification as indicating the scope of the invention.

We claim:
1. A compound of formula

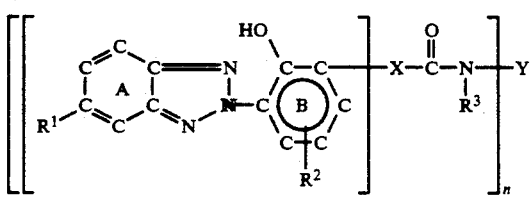

I or

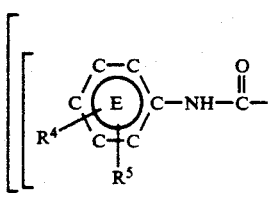

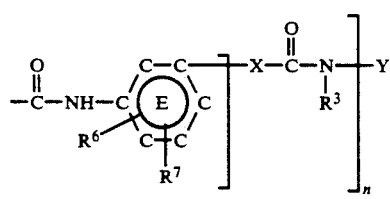

II where
R$^1$ is hydrogen, substituted or unsubstituted aliphatic of 1-8 carbons, substituted or unsubstituted alkoxy of 1-8 carbons, substituted or unsubstituted alkoxycarbonyl of 2-8 carbons, alkylaminocarbonyl of 2-5 carbons, dialkylaminocarbonyl of 3-9 carbons, substituted or unsubstituted N-(alkyl)-N--(aryl)aminocarbonyl of 8-15 carbons, alkoxysulfonyl of 1-4 carbons, —C(=O)—OH, —C(=O)NH$_2$, or —S(=O)$_2$—OH;

R$^2$ is hydrogen, substituted or unsubstituted aliphatic of 1-8 carbons, substituted or unsubstituted aryl of 6-14 carbons, substituted or unsubstituted araliphatic of 7-22 carbons, substituted or unsubstituted alkoxy of 1-8 carbons, alkylaminocarbonyl of 2-5 carbons, dialkylaminocarbonyl of 3-9 carbons, or substituted or unsubstituted N-(alkyl)-N-(aryl-)aminocarbonyl of 8-15 carbons;

R$^3$ is hydrogen, substituted or unsubstituted aliphatic of 1-20 carbons, substituted or unsubstituted araliphatic of 7-22 carbons, or substituted or unsubstituted alicyclic of 5-12 carbons;

R$^4$, R$^5$, R$^6$ and R$^7$ are independently hydrogen, hydroxy, substituted or unsubstituted aliphatic of 1-8 carbons, substituted or unsubstituted aryl of 6-14 carbons, substituted or unsubstituted araliphatic of 7-22 carbons, substituted or unsubstituted alkoxy of 1-12 carbons or substituted or unsubstituted alkylthio of 1-12 carbons, chloro, bromo, or substituted or unsubstituted alkoxycarbonyl of 2-8 carbons;

X is X$_a$ when attached to ring A, X$_b$ when attached to ring B and X$_e$ when attached to either ring E;

X$_a$ is a direct bond;

X$_b$ and X$_e$ are independently divalent radicals of formula —Z$_x$—R$^8$—{N(R$^9$)—[C(=O)]$_y$—R$^{10}$—}$_z$—;

Z is —O—, —N(R$^{11}$)—, —S—, or —S(=O)$_2$—;

x, y and z are independently 0 or 1;

R$^8$ is a direct bond or substituted or unsubstituted alkylene diradical of 1-4 carbons, with the proviso that when both x and z are 1, R$^8$ is not a direct bond;

R$^9$ is hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons;

R$^{10}$ is a direct bond, substituted or unsubstituted aliphatic diradical of 1-20 carbons, substituted or unsubstituted aryl diradical of 6-12 carbons, substituted or unsubstituted alicyclic diradical of 5-12 carbons, or substituted or unsubstituted araliphatic diradical of 7-22 carbons;

R$^{11}$ is hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons;

n is 1 or 2;

when n is 1, Y is

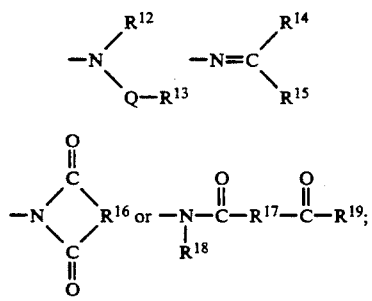

when n is 2, Y is

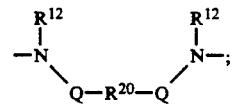

R$^{12}$ is hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons;

R$^{13}$ is substituted or unsubstituted aliphatic of 1-20 carbons, substituted or unsubstituted alicyclic of 5-12 carbons optionally containing 1-6 heteroatoms —O—, —S— or —N(R$^{21}$)— with the proviso that multiple heteroatoms must be separated from each other and the chain ends by at least one carbon atom, or $R^{13}$ is substituted or unsubstituted aryl of 6-14 carbons, substituted or unsubstituted araliphatic of 7-22 carbons, or when n is 1, Q is a direct bond, X is $X_b$ and $X_b$ is a substituted or unsubstituted alkylene diradical of 3-4 carbons, $R^{13}$ is also hydrogen;

Q is $-S(=O)_2-$, $-C(=O)-O-$, $-[C(=O)]_2-O-$, $-C(=O)-N(R^{22})-$, $-[C(=O)]_2-N(R^{22})-$, $-C(=S)-N(R^{22})-$, or $-C(=O)-R^{17}-C(=O)-N(R^{22})-$; or $-C(=O)-$ if both x and z are not 0; or a direct bond between the nitrogen and $R^{13}$ when n is 1 and $R^{13}$ is not H;

$R^{14}$ and $R^{15}$ are independently hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons, or $R^{14}$ and $R^{15}$ may be linked together to form a substituted or unsubstituted alicyclic ring of 5-12 carbons or may be linked together through a heteroatom $-N(R^{21})-$, $-O-$ or $-S-$ to form a heterocyclic ring of 5-12 atoms;

$R^{16}$ is a substituted or unsubstituted aliphatic diradical of 2-200 carbons with the proviso that when x and z are 0, $R^{16}$ is not 1,2-ethenediyl, or $R^{16}$ is substituted or unsubstituted aryl diradical of 6-14 carbons, substituted or unsubstituted araliphatic diradical of 7-22 carbons, or substituted or unsubstituted alicyclic diradical of 5-12 carbons optionally containing 1-6 heteroatoms $-O-$, $-S-$ or $-N(R^{21})-$, with the provisos that (a) multiple heteroatoms must be separated from each other and the diradical ends by at least one carbon atoms, and (b) the cyclic group formed contains 5 or 6 atoms in the ring;

$R^{17}$ is a substituted or unsubstituted aliphatic diradical of 1-200 carbons, substituted or unsubstituted aryl diradical of 6-14 carbons, substituted or unsubstituted araliphatic diradical of 7-22 carbons, or substituted or unsubstituted alicyclic diradical of 5-12 carbons optionally containing 1-6 heteroatoms $-O-$, $-S-$ or $-N(R^{21})-$ with the proviso that multiple heteroatoms must be separated from each other and the diradical ends by at least one carbon atom;

$R^{18}$ is hydrogen, substituted or unsubstituted aliphatic of 1-20 carbons, substituted or unsubstituted araliphatic of 7-22 carbons, or substituted or unsubstituted alicyclic of 5-12 carbons;

$R^{19}$ is $R^{13}-NH-$ or $-OM$;

$R^{20}$ is a substituted or unsubstituted aliphatic diradical of 1-20 carbons, substituted or unsubstituted aryl diradical of 6-12 carbons, substituted or unsubstituted alicyclic diradical of 5-14 carbons, or substituted or unsubstituted araliphatic diradical of 7-22 carbons;

$R^{21}$ is hydrogen, aliphatic of 1 to 8 carbons, aliphatic acyl of 2-6 carbons, or substituted or unsubstituted benzoyl;

$R^{22}$ is hydrogen or aliphatic of 1-4 carbons;

M is hydrogen, sodium ion, potassium ion or ammonium ion;

optional substituents for $R^1$, $R^2$, $R^3$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ are independently one or more of chloro, bromo, alkyl of 1-4 carbons, alkoxy of 1-8 carbons, phenoxy, cyano, hydroxy, epoxy, carboxy, alkoxycarbonyl of 2-6 carbons, acyloxy of 1-4 carbons, acryloyl, acryloyloxy, methacryloyl, methacryloyloxy, hydroxymethyl, hydroxyethyl, alkylthio of 1-4 carbons, or trialkoxysilyl of 3-12 carbons;

optional substituents for $R^4$, $R^5$, $R^6$ and $R^7$ are independently one or more of chloro, alkyl of 1-5 carbons, hydroxy, acyloxy of 1-4 carbons, alkenyl of 2-5 carbons, or alkoxy of 1-8 carbons;

additional optional substituents for $R^{13}$ are aliphatic of 1-20 carbons, cycloaliphatic of 5-12 carbons, aryl of 6-14 carbons, aralkyl of 7-22 carbons, alkoxy of 1-20 carbons, cycloalkoxy of 5-12 carbons, aryloxy of 6-14 carbons, aralkoxy of 7-15 carbons, aliphatic acyloxy of 2-20 carbons, alicyclic acyloxy of 6-13 carbons, aryl acyloxy of 7-15 carbons, or araliphatic acyloxy of 8-16 carbons; and additional optional substituents for $R^{16}$ and $R^{17}$ are independently alkyl of 5-180 carbons, alkylthio of 5-180 carbons, aralkylthio of 7-20 carbons, arylthio of 6-20 carbons, alkenyl of 2-180 carbons, cycloalkenyl of 5-12 carbons, aryl of 6-16 carbons, aralkyl of 7-17 carbons, aryloxy of 6-16 carbons, alkoxycarbonyl of 7-10 carbons, or (alkoxycarbonyl)alkylthio of 3-30 carbons.

2. The compound of claim 1 wherein $R^1$ is hydrogen, substituted or unsubstituted aliphatic of 1-8 carbons, substituted or unsubstituted alkoxy of 1-8 carbons, methoxycarbonyl, ethoxycarbonyl, carboxy, chloro, or $S(=O)_2-OH$;

$R^2$ is hydrogen, substituted or unsubstituted aliphatic of 1-8 carbons, or substituted or unsubstituted araliphatic of 7-9 carbons;

$R^3$ is hydrogen;

$R^4$, $R^5$, $R^6$ and $R^7$ are independently hydrogen, hydroxy, alkyl of 1-8 carbons, alkoxy of 1-8 carbons, alkylthio of 1-8 carbons, chloro, bromo, or alkoxycarbonyl of 2-8 carbons;

$R^8$ is a direct bond, methylene, 1,2-ethanediyl or 1,1-dimethyl-1,4-butanediyl, with the proviso that when both x and z are 1, $R^8$ is not a direct bond;

$R^9$ is hydrogen, substituted or unsubstituted aliphatic of 1-12 carbons, substituted or unsubstituted alicyclic of 5-8 carbons, substituted or unsubstituted phenyl, or substituted or unsubstituted araliphatic of 7-9 carbons;

$R^{10}$ is a direct bond, an aliphatic diradical of 1-8 carbons, 1,3-phenylene diradical, or 1,4-phenylene diradical;

$R^{11}$ is hydrogen, substituted or unsubstituted aliphatic of 1-12 carbons, substituted or unsubstituted alicyclic of 5-8 carbons, substituted or unsubstituted phenyl, or substituted or unsubstituted araliphatic of 7-9 carbons;

$R^{12}$ is hydrogen, substituted or unsubstituted aliphatic of 1-12 carbons, substituted or unsubstituted alicyclic of 5-8 carbons, substituted or unsubstituted phenyl, or subsituted or unsubstituted araliphatic of 7-9 carbons;

$R^{13}$ is substituted or unsubstituted aliphatic of 1-12 carbons, substituted or unsubstituted phenyl, substituted or unsubstituted araliphatic of 7-9 carbons, or substituted or unsubstituted alicyclic of 5-8 carbons optionally containing 1 or 2 heteroatoms $-O-$ or $-N(R^{21})-$, provided they are separated from each other and the chain ends by at least one carbon atom, or when n is 1, Q is a direct bond, X is $X_b$ and $X_b$ is a substituted or unsubstituted alkylene diradical of 3-4 carbons, $R^{13}$ is also hydrogen;

Q is —C(=O)—O—, —[C(=O)]$_2$—O—, —C(=O)—N(R$^{22}$)—, or —[C(=O)]$_2$—N(R$^{22}$)—; or —C(=O)— if both x and z are not 0; or a direct bond between the nitrogen and $R^{13}$ when n is 1 and $R^{13}$ is not H;

$R^{14}$ and $R^{15}$ are independently substituted or unsubstituted aliphatic of 1-8 carbons, substituted or unsubstituted alicyclic of 5-8 carbons, substituted or unsubstituted aryl of 6-12 carbons, or substituted or unsubstituted araliphatic of 7-14 carbons, or $R^{14}$ and $R^{15}$ may be linked together to form a substituted or unsubstituted cyclohexyl, or a substituted or unsubstituted 2,2,6,6-tetraalkyl-4-piperidine ring;

$R^{16}$ is substituted or unsubstituted aliphatic diradical of 2-30 carbons with the proviso that when x and z are 0, $R^{16}$ is not 1,2-ethenediyl, or $R^{16}$ is substituted or unsubstituted orthophenylene, or a substituted or unsubstituted alicyclic diradical of 6-8 carbons optionally containing 1 or 2 heteroatoms —O— or —N(R$^{21}$)—;

$R^{17}$ is a substituted or unsubstituted aliphatic diradical of 2-18 carbons, substituted or unsubstituted phenylene, or substituted or unsubstituted alicyclic diradical of 6-8 carbons optionally containing 1 or 2 heteroatoms —O— or —N(R$^{21}$)—;

$R^{18}$ is hydrogen, substituted or unsubstituted aliphatic of 1-8 carbons, substituted or unsubstituted araliphatic of 7 or 8 carbons, or substituted or unsubstituted alicyclic of 5-8 carbons;

$R^{20}$ is a substituted or unsubstituted aliphatic diradical of 2-12 carbons, substituted or unsubstituted aryl diradical of 6-12 carbons, substituted or unsubstituted alicyclic diradical of 5-12 carbons, or substituted or unsubstituted araliphatic diradical of 7-12 carbons;

$R^{21}$ is hydrogen or methyl;

$R^{22}$ is hydrogen or methyl; and

M is hydrogen or sodium ion.

3. The compound of claim 2 having formula I wherein $R^1$ is hydrogen, alkyl of 1-4 carbons, methoxy, ethoxy, chloro, or carboxy;

$R^2$ is methyl, ethyl, t-butyl, t-octyl or 1-methyl-1-phenylethyl;

X is $X_b$;

$X_b$ is a divalent radical of formula —Z$_x$—R$^8$—{—N(R$^9$)—[C(=O)]$_y$—R$^{10}$—}$_z$—;

Z is —O—, —N(R$^{11}$)—, or —S—;

$R^9$ is hydrogen, substituted or unsubstituted aliphatic of 1-10 carbons, substituted or unsubstituted cyclohexyl, substituted or unsubstituted phenyl, or substituted or unsubstituted araliphatic of 7-9 carbons;

$R^{10}$ is a direct bond or alkylene diradical of 1-8 carbons;

$R^{11}$ is hydrogen, substituted or unsubstituted aliphatic of 1-10 carbons, substituted or unsubstituted cyclohexyl, substituted or unsubstituted phenyl or substituted or unsubstituted araliphatic of 7-9 carbons;

$R^{12}$ is hydrogen, substituted or unsubstituted aliphatic of 1-10 carbons, substituted or unsubstituted cyclohexyl, substituted or unsubstituted phenyl, or substituted or unsubstituted araliphatic of 7-9 carbons;

$R^{13}$ is substituted or unsubstituted aliphatic of 1-10 carbons, substituted or unsubstituted cyclohexyl, 2,2,6,6-tetraalkyl-4-piperidinyl, substituted or unsubstituted phenyl, or substituted or unsubstituted araliphatic of 7-14 carbons, or when n is 1, Q is a direct bond, and $X_b$ is a substituted or unsubstituted alkylene diradical of 3-4 carbons, $R^{13}$ is also hydrogen;

$R^{14}$ and $R^{15}$ are independently aliphatic of 1-8 carbons or alicyclic of 5-8 carbons, or $R^{14}$ and $R^{15}$ may be linked together to form a substituted or unsubstituted cyclohexyl ring or a 2,2,6,6-tetraalkyl-4-piperidinyl ring;

$R^{16}$ is a substituted or unsubstituted aliphatic diradical of 2-20 carbons, with the proviso that when x and z are 0, $R^{16}$ is not 1,2-ethenediyl, or $R^{16}$ is a substituted or unsubstituted alicyclic diradical of 6-8 carbons;

$R^{17}$ is a substituted or unsubstituted aliphatic diradical of 2-8 carbons;

$R^{18}$ is hydrogen, substituted or unsubstituted aliphatic of 1-8 carbons, benzyl or substituted or unsubstituted cyclohexyl;

$R^{20}$ is a substituted or unsubstituted aliphatic diradical of 2-10 carbons, substituted or unsubstituted phenylene, substituted or unsubstituted alicyclic diradical of 5-8 carbons, or substituted or unsubstituted araliphatic diradical of 7-12 carbons;

$R^{21}$ is hydrogen or methyl;

$R^{22}$ is hydrogen or methyl; and

M is hydrogen.

4. The compound of claim 3 wherein $R^1$ is hydrogen, alkyl of 1-4 carbons, or chloro;

$R^2$ is methyl, ethyl, t-butyl, or t-octyl;

$X_b$ is a divalent radical —CH$_2$—CH$_2$—, —CH$_2$—NH—, —CH$_2$—NH—C(=O)—R$^{10}$—, —O—R$^8$—, or —C(CH$_3$)$_2$—(CH$_2$)$_3$—;

$R^8$ is a direct bond, methylene, or 1,2-ethanediyl;

$R^{12}$ is hydrogen;

$R^{13}$ is substituted or unsubstituted aliphatic of 1-10 carbons, substituted or unsubstituted cyclohexyl, 2,2,6,6-tetraalkyl-4-piperidinyl, substituted or unsubstituted phenyl, substituted or unsubstituted araliphatic of 7-14 carbons, or $R^{13}$ is also hydrogen when $X_b$ is —C(CH$_3$)$_2$—(CH$_2$)$_3$—;

Q is —C(=O)—O—, —[C(=O)]$_2$—O—, —C(=O)—N(R$^{22}$)—, or —[C(=O)]$_2$—N(R$^{22}$)—; or —C(=O)— if $X_b$ is not 1,2-ethanediyl; or a direct bond between the nitrogen and $R^{13}$ when n is 1;

$R^{16}$ is a substituted or unsubstituted aliphatic diradical of 2-20 carbons, or substituted or unsubstituted alicyclic diradical of 6-8 carbons, with the proviso that when $X_b$ is 1,2-ethanediyl, $R^{16}$ is not 1,2-ethenediyl.

5. The compound of claim 4 wherein n is 1.

6. The compound of claim 5 wherein $R^1$ is hydrogen;

$R^2$ is t-butyl and is in a position ortho to the hydroxyl group;

$X_b$ is —CH$_2$—CH$_2$— and is in a position para to the hydroxyl group;

n is 1;

$R^{13}$ is substituted or unsubstituted aliphatic of 1-10 carbons, substituted or unsubstituted cyclohexyl, 2,2,6,6-tetraalkyl -4-piperidinyl, substituted or unsubstituted phenyl, or substituted or unsubstituted araliphatic of 7-14 carbons;

Q is —C(=O)—O—, —[C(=O)]$_2$—O—, —C(=O)—N(R$^{22}$)—, —[C(=O)]$_2$—N(R$^{22}$)—, or a direct bond between the nitrogen and $R^{13}$;

$R^{16}$ is a substituted or unsubstituted aliphatic diradical of 2-20 carbons, with the proviso that $R^{16}$ is not 1,2-ethenediyl, or $R^{16}$ is a substituted or unsubstituted alicyclic diradical of 6-8 carbons; and $R^{22}$ is hydrogen.

7. The compound of claim 6 which is 3-[3-(2H-benzotriazol-2-yl)-4-hydroxy-5-t-butylphenyl]-N'-(ethoxycarbonyl)propionyl hydrazide.

8. The compound of claim 6 which is 3-[3-(2H-benzotriazol-2-yl)-4-hydroxy-5-t-butylphenyl]-N'-(butylaminocarbonyl)propionyl hydrazide.

9. The compound of claim 6 which is the 2-butanone, 3-[3-(2H-benzotriazol-2-yl)-4-hydroxy-5-t-butylphenyl]propionyl hydrazone.

10. The compound of claim 6 which is 3-[3-(2H-benzotriazol-2-yl)-4-hydroxy-5-t-butylphenyl]-N-(2-octadecylsuccinimido)propanamide.

11. The compound of claim 2 having formula I wherein
X is $X_b$;
$X_b$ is $-Z_x-R^8-\{-N(R^9)-[C(=O)]_y-R^{10}-\}_z-$;
x and z are 0;
$R^8$ is $-C(CH_3)_2-(CH_2)_3-$;
n is 1;
Y is

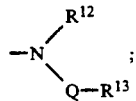

Q is a direct bond and $R^{12}$ and $R^{13}$ are hydrogen.

12. The compound of claim 4 wherein
$R^1$ and $R^2$ are hydrogen;
$X_b$ is $-O-R^8-$ and is in a position meta to the hydroxyl group;
$R^8$ is $-CH_2-$;
$R^{13}$ is substituted or unsubstituted aliphatic of 1-10 carbons, substituted or unsubstituted cyclohexyl, 2,2,6,6-tetraalkyl-4-piperidinyl, substituted or unsubstituted phenyl, or substituted or unsubstituted araliphatic of 7-14 carbons;
Q is $-C(=O)-$, $-C(=O)-O-$, $-[C(=O)]_2-O-$, $-C(=O)-N(R^{22})-$, $-[C(=O)]_2-N(R^{22})-$, or a direct bond between the nitrogen and $R^{13}$; and
$R^{16}$ is a substituted or unsubstituted aliphatic diradical of 2-20 carbons or a substituted or unsubstituted alicyclic diradical of 6-8 carbons.

13. The compound of claim 12 which is 2-[3-hydroxy-4-(2H-benzotriazol-2-yl)phenoxy]-N'-methylacetyl hydrazide.

14. The compound of claim 4 wherein
$R^2$ is methyl, ethyl, t-butyl or t-octyl and is in a position para to the hydroxyl group;
$X_b$ is $-CH_2-NH-C(=O)-R^{10}-$ and is in a position ortho to the hydroxyl group;
$R^{10}$ is a direct bond or an alkylene diradical of 2 or 4 carbons; and
$R^{16}$ is a substituted or unsubstituted aliphatic diradical of 2-20 carbons or unsubstituted alicyclic diradical of 6-8 carbons.

15. The compound of claim 14 wherein
$R^1$ is hydrogen;
$R^2$ is methyl and is in a position para to the hydroxyl group;
n is 1;

$R^{13}$ is substituted or unsubstituted aliphatic of 1-10 carbons, substituted or unsubstituted cyclohexyl, 2,2,6,-tetraalkyl-4-piperidinyl, substituted or unsubstituted phenyl, or substituted or unsubstituted araliphatic of 7-14 carbons;
Q is $-C(=O)-$, $-C(=O)-O-$, $-[C(=O)]_2-O-$, $-C(=O)-N(R^{22})-$, $-[C(=O)]_2-N(R^{22})-$, or a direct bond between the nitrogen and $R^{13}$;
$R^{16}$ is a substituted or unsubstituted aliphatic diradical of 2-20 carbons or unsubstituted alicyclic diradical of 6-8 carbons;
$R^{22}$ is hydrogen; and
M is hydrogen.

16. The compound of claim 15 which is 2-{[2-hydroxy-3-(2H-benzotriazol-2-yl)-5-methylphenyl]methylamino}-2-oxo-N'-(3-carboxypropenoyl)acetyl hydrazide.

17. The compound of claim 15 which is 2-{[2-hydroxy-3-(2H-benzotriazol-2-yl)-5-methylphenyl]methylamino}-2-oxo-N-(2-octadecylsuccinimido)acetamide.

18. The compound of claim 15 which is 2-{[2-hydroxy-3-(2H-benzotriazol-2-yl)-5-methylphenyl]methylamino}-2-oxo-N'-(butylaminocarbonyl)acetyl hydrazide.

19. The compound of claim 15 which is 2-{[2-hydroxy-3-(2H-benzotriazol-2-yl)-5-methylphenyl]methylamino}-2-oxo-N'-(octadecylaminocarbonyl)acetyl hydrazide.

20. The compound of claim 2 having formula II wherein
X is $X_e$;
$X_e$ is a divalent radical of formula $-Z_x-R^8-\{-N(R^9)-[C(=O)]_y-R^{10}-\}_z-$;
Z is $-O-$, $-N(R^{11})$ or $-S-$;
$R^{13}$ is hydrogen, substituted or unsubstituted aliphatic of 1-12 carbons, substituted or unsubstituted phenyl, substituted or unsubstituted araliphatic of 7-9 carbons, or substituted or unsubstituted alicyclic of 5-8 carbons optionally containing 1 or 2 heteroatoms $-O-$ or $-N(R^{21})-$, with the proviso that the two heteroatoms are separated from each other and the chain ends by at least one carbon atom; and
Q is $-C(=O)-$, $-C(=O)-O-$, $-[C(=O)]_2-O-$, $-C(=O)-N(R^{22})-$, $-[C(=O)]_2-N(R^{22})-$, or a direct bond between the nitrogen and $R^{13}$ when n is 1.

21. The compound of claim 20 wherein
$R^4$, $R^5$, $R^6$ and $R^7$ are independently hydrogen, hydroxy, alkyl of 1-8 carbons, alkoxy of 1-4 carbons, methoxycarbonyl, or ethoxycarbonyl,
$X_e$ is a divalent radical $-O-R^8-$, $-NH-R^8-$, or $-R^8-$;
$R^8$ is a direct bond, methylene, or 1,2-ethanediyl;
n is 1;
$R^{12}$ is hydrogen;
Q is $-C(=O)-$, $-C(=O)-O-$, $-[C(=O)]_2-O-$, $-C(=O)-N(R^{22})-$, $-[C(=O)]_2^{13}N(R^{22})-$, or a direct bond between the nitrogen and $R^{13}$;
$R^{14}$ and $R^{15}$ are independently aliphatic of 1-8 carbons or alicyclic of 5-8 carbons, or $R^{14}$ and $R^{15}$ may be linked together to form a substituted or unsubstituted cyclohexyl ring or a 2,2,6,6-tetraalkyl-4-piperidinyl ring;

$R^{16}$ is a substituted or unsubstituted aliphatic diradical of 2-20 carbons or an unsubstituted alicyclic diradical of 6-8 carbons;

$R^{17}$ is a substituted or unsubstituted aliphatic diradical of 2-8 carbons;

$R^{18}$ is hydrogen, substituted or unsubstituted aliphatic of 1-8 carbons, benzyl or substituted or unsubstituted cyclohexyl; and M is hydrogen.

22. The compound of claim 21 wherein $X_e$ is $-O-R^8-$;

$R^8$ is $-CH_2-$; and $R^4$, $R^5$, $R^6$ and $R^7$ are hydrogen.

23. The compound of claim 22 which is 2-{2-[(phenylamino)-2-oxoacetamido]phenoxy}acetyl hydrazide.

24. The compound of claim 22 which is 2-{2-[(phenylamino)-2-oxoacetamido]phenoxy}-N-(octadecylsuccinimido)acetamide.

* * * * *